(12) United States Patent
Okai et al.

(10) Patent No.: US 6,366,044 B2
(45) Date of Patent: Apr. 2, 2002

(54) ROTATIONAL-POSITION SENSING DEVICE AND WINDSHIELD WIPER SYSTEM HAVING THE SAME

(75) Inventors: Hideo Okai, Hamamatsu; Toshio Yamamoto; Yasuaki Uchida, both of Kosai, all of (JP)

(73) Assignee: Asmo Co., Ltd., Shizuoka (JP)

( * ) Notice: Subject to any disclaimer, the term of this patent is extended or adjusted under 35 U.S.C. 154(b) by 0 days.

(21) Appl. No.: 09/883,351

(22) Filed: Jun. 19, 2001

(30) Foreign Application Priority Data

| Jul. 4, 2000 | (JP) | 2000-202185 |
| Jul. 4, 2000 | (JP) | 2000-202186 |
| Mar. 14, 2001 | (JP) | 2001-071925 |
| May 7, 2001 | (JP) | 2001-135715 |

(51) Int. Cl.$^7$ ................................................. B60S 1/08
(52) U.S. Cl. ................. 318/445; 318/443; 318/DIG. 2; 15/250.13; 15/250.22
(58) Field of Search ......................... 15/250.22, 250.13; 318/445, 443, DIG. 2

(56) References Cited

U.S. PATENT DOCUMENTS

| 3,649,990 A | * | 3/1972 | Saito | 15/250.22 |
| 3,719,787 A | * | 3/1973 | Tomecek | 200/61.27 |
| 4,673,853 A | * | 6/1987 | Tsunoda et al. | 318/443 |
| 4,723,101 A | * | 2/1988 | Bauer et al. | 318/443 |
| 5,093,952 A | | 3/1992 | Nakatsukasa et al. | 15/250.13 |
| 5,344,090 A | * | 9/1994 | Nakai et al. | 242/18 A |

FOREIGN PATENT DOCUMENTS

| JP | U-61-35068 | 3/1986 |

* cited by examiner

*Primary Examiner*—Paul Ip
*Assistant Examiner*—Rita Leykin
(74) *Attorney, Agent, or Firm*—Law Office of David G. Posz

(57) ABSTRACT

A spindle and a position-limiting ridge protrude from an inner surface of a cover to rotatably support a follower made of an electrically conductive metal plate. A cylindrical engaging portion of the follower slidably engages the spindle. A toothed washer is fitted around the spindle to clamp a contact portion of the follower between the position-limiting ridge and the toothed washer in a rotatable manner. A switching pattern is provided in the inner surface of the cover. Contact terminals that engage and disengage with the switching pattern based on rotation of the follower are integrally formed in the follower. An engaging hole penetrates through the follower. An engaging protrusion on a carrier is received within the engaging hole. The follower is rotated through engagement between the engaging protrusion and the engaging hole when the carrier rotates in a forward rotational direction.

27 Claims, 22 Drawing Sheets

ROTATIONAL-POSITION SENSING DEVICE AND WINDSHIELD WIPER SYSTEM HAVING THE SAME

CROSS REFERENCE TO RELATED APPLICATION

This application is based on and incorporates herein by reference Japanese Patent Application No. 2000-202185 filed on Jul. 4, 2000, Japanese Patent Application No. 2000-202186 filed on Jul. 4, 2000, Japanese Patent Application No. 2001-71925 filed on Mar. 14,2001 and Japanese Patent Application No. 2001-135715 filed on May 7, 2001.

BACKGROUND OF THE INVENTION

1. Field of the Invention

The present invention relates to a rotational-position sensing device and a windshield wiper system.

2. Description of Related Art

FIG. 26 shows a rotational-position sensing device for a windshield wiper system disclosed in Japanese Unexamined Utility Model Publication No. 61-35068. A worm 1 and a wheel (acting as a rotator) 2 meshed with the worm 1 constitute a speed reducing gear mechanism. Rotation of an output shaft 3 secured to the wheel 2 is transmitted to a crank mechanism (not shown) acting as a reciprocating swing mechanism. The crank mechanism reciprocally swings wiper blades (not shown) along a windshield.

A cover 4 that covers a gear case opposes the wheel 2. A follower 5 is rotatably supported by a spindle 4a that protrudes from the cover 4. A switching pattern 6 is arranged in an opposing surface of the follower 5 that opposes the cover 4. A plurality of contact terminals 7 are arranged in an opposing surface of the cover 4 that opposes the follower 5. The rotation of the wheel 2, which generates the swing motion of the wiper blades, is transmitted to the follower 5 through engagement between a protrusion 8 of the wheel 2 and a protrusion 9 of the follower 5, so that the follower 5 is integrally rotated with the wheel 2. As the follower 5 rotates, the contact terminals 7 engage and disengage with the switching pattern 6, so that a rotational position of the wheel 2 or a rotational position of the output shaft 3 is sensed or detected.

The contact terminals 7 are urged against the switching pattern 6 because of their own resilient forces. When the resilient forces of the contact terminals 7 are summed and are applied to the follower 5 to lever the follower 5 about the spindle 4a, the follower 5 tilts with respect to the spindle 4a. When the follower 5 tilts, the follower 5 cannot rotate freely, causing an increased rotational resistance of the follower 5. The increase in the rotational resistance of the follower 5 normally results in a decrease in a transmission efficiency of the power transmission system between a wiper drive motor and the follower 5. Furthermore, the tilt of the follower 5 may cause a contact failure between the contact terminals 7 and the switching pattern 6. Such a contact failure causes a reduction in a sensing accuracy of the rotational-position sensing device.

To restrain the tilt of the follower 5, a wave washer 61 is inserted around the spindle 4a to urge the follower 5 in an axial direction away from it, and a stationary engaging member 62, such as a C-ring, is fitted around the spindle 4a to hold the follower 5 in place around the spindle 4a.

However, when an excess force that overcomes the urging force of the wave washer 61 is applied to the follower 5, the follower 5 is still tilted. Furthermore, both the wave washer 61 and the stationary engaging member 62 are required in the above case, so that a number of assembling steps and a number of components to be assembled are disadvantageously increased.

Furthermore, the wiper blades are controlled to be stopped at a predetermined stop position which is generally one swing end position of the wiper blades. More specifically, when a vehicle driver manually turns off a wiper switch, the following control operation is conducted. That is, the wiper drive motor drives the wiper blades to the predetermined stop position and then stops the wiper blades in the predetermined stop position. This type of automatic stop arrangement for automatically stops the wiper blades in the predetermined stop position is disclosed in Japanese Unexamined Utility Model Publication No. 61-35068. By way of example, it will be assumed that a relatively large amount of snow is present on the windshield. In the windshield wiper system having the automatic stop arrangement, the wiper blades wipe the snow toward the predetermined stop position. When the wiper blades reach the predetermined stop position, the wiper drive motor is turned off, so that the wiper blades lose its driving force. Since the snow has been packed by the wiper blades, the snow exerts a reaction force against the wiper blades to move the wiper blades backward out of the predetermined stop position, and the wiper drive motor is forced to rotate backward. When the follower 5 is rotated backward due to the backward rotation of the wiper drive motor, a state of engagement and disengagement between the switching pattern 6 and the contact terminals 7 is changed to another state different from one that is seen while the wiper blades are held in the stop position. This change in the state of engagement and disengagement causes the wiper drive motor to drive the wiper blades toward the stop position. This results in chattering of the wiper system.

In the previously proposed rotational-position sensing device shown in FIG. 26, when the backward rotation of the wiper drive motor or the backward rotation of the wheel 2 occurs, the protrusions 8 and 9 are moved away from each other, so that the backward rotation of the wheel 2 is not transmitted to the follower 5. The prevention of the transmission of the backward rotation of the wheel 2 to the follower 5 prevents chattering of the wiper system.

However, the contact terminals 7 need to be secured to the cover 4 in manufacturing. Furthermore, the switching pattern 6 and the protrusion 9 need to be provided in the follower 5. Thus, a number of components to be assembled is increased. Because of this, parts management becomes more complicated, and a number of assembling steps is disadvantageously increased.

SUMMARY OF THE INVENTION

The present invention addresses the above disadvantages. Thus, it is an objective of the present invention to provide a rotational-position sensing device that senses a rotational position of a rotator through engagement and disengagement of contact terminals with a switching pattern based on rotation of a follower and that can be manufactured with a reduced number of assembling steps and a reduced number of components to be assembled while effectively restraining tilt of the follower. It is another objective of the present invention to provide a windshield wiper system having such a rotational-position sensing device. It is a further objective of the present invention to provide a rotational-position sensing device that restrains a change in a state of engagement and disengagement between the switching pattern and the contact terminals when the rotator is forced to rotate in a backward rotational direction and that has a reduced number of components to be assembled while achieving an improved manufacturability of the rotational-position sensing device. It is a further objective of the present invention to provide a windshield wiper system having such a rotational-position sensing device.

To achieve the objectives of the present invention, there is provided a rotational-position sensing device including a stationary body, a rotator and a follower. The stationary body includes a switching pattern. The rotator is rotatably supported by the stationary body. The rotator has a driving-side engaging means. The switching pattern is provided around a rotational axis of the rotator. The follower receives a rotational force to rotate about the rotational axis from the rotator through the driving-side engaging means. The follower is made of an electrically conductive metal plate. The follower has a plurality of contact terminals integrally formed in the electrically conductive metal plate. The follower further includes a driven-side engaging means that receives the rotational force from the rotator during rotation of the rotator in a forward rotational direction upon engagement with the driving-side engaging means in a forward rotational engaged position. The rotational-position sensing device senses a rotational position of the rotator through engagement and disengagement of the contact terminals with the switching pattern based on rotation of the follower. The driven-side engaging means has a play. The play allows the driving-side engaging means to move away from the forward rotational engaged position without transmitting the rotational force to the follower when the rotator rotates in a backward rotational direction.

To achieve the objectives of the present invention, there is also provided a windshield wiper system comprising a wiper arm with a wiper blade connected thereto, a motor and a control device. The motor has a rotational-position sensing device for sensing a rotational position of the wiper blade, a gear housing and a speed reducing mechanism. The gear housing includes a receiving recess and a cover for covering the receiving recess. The speed reducing mechanism is received within the receiving recess. The speed reducing mechanism is connected to an output shaft for outputting a rotational force of the speed reducing mechanism. The control device includes a wiper switch and controls the motor based on an operation mode selected through the wiper switch. The wiper arm and the wiper blade are reciprocally swung by a rotational driving force of the motor. The rotational-position sensing device includes a rotator, a switching pattern and a follower. The rotator is rotatably supported by the gear housing. The rotator has a driving-side engaging means and rotates integrally with the output shaft. The switching pattern is formed in the cover around a rotational axis of the rotator. The switching pattern includes a first rotational position and a second rotational position. The first rotational position corresponds to a predetermined stop position of the wiper blade. The second rotational position indicates a rotational position of the wiper blade other than the first rotational position of the wiper blade. The follower is made of an electrically conductive metal plate. The follower includes a plurality of contact terminals and a driven-side engaging means. The contact terminals are integrally formed in the electrically conductive metal plate. The contact terminals engage and disengage with the switching pattern. The driven-side engaging means receives a rotational force to rotate about the rotational axis during rotation of the rotator in a forward rotational direction upon engagement with the driving-side engaging means in a forward rotational engaged position. The driven-side engaging means has a play. The play allows the driving-side engaging means to move away from the forward rotational engaged position without transmitting the rotational force to the follower when the rotator rotates in a backward rotational direction.

To achieve the objectives of the present invention, there is also provided a rotational-position sensing device including a stationary body, a rotator, a follower, a switching pattern, a plurality of contact terminals and a space maintaining means. The rotator is rotatably supported by the stationary body. The follower is rotatably supported by a support element provided on the stationary body. The support element is coaxial with the rotator. The follower is positioned between the stationary body and the rotator and receives a rotational force from the rotator. The follower has a cylindrical engaging portion provided at a center of the follower. The cylindrical engaging portion having a peripheral surface that slidably engages a peripheral surface of the support element. The switching pattern is formed in one of the stationary body and the follower. The contact terminals are formed in the other of the stationary body and the follower. A rotational position of the rotator is sensed through engagement and disengagement of the contact terminals with the switching pattern based on rotation of the follower. A signal indicative of the rotational position of the rotator is outputted from the rotational-position sensing device. The space maintaining means is provided around the support element to maintain a predetermined space between the follower and an opposing surface of the stationary body that axially opposes the follower.

To achieve the objectives of the present invention, there is also provided a windshield wiper system including a wiper, a reciprocating swing mechanism, a motor, a speed reducing mechanism, a rotational-position sensing device and a control device. The reciprocating swing mechanism reciprocally swings the wiper. The motor has a gear housing. The speed reducing mechanism is received in the gear housing to transmit rotation of the motor at a reduced speed. The rotation of the motor is transmitted to the wiper through the speed reducing mechanism and the reciprocating swing mechanism to reciprocally swing the wiper. The rotational-position sensing device includes a rotator, a follower, a switching pattern, a plurality of contact terminals and a space maintaining means. The rotator is rotatably supported by the gear housing. The rotator is integrally rotated with an output shaft that receives a rotational force from the speed reducing mechanism. The follower is rotatably supported by a support element provided in the gear housing. The support element is coaxial with the rotator. The follower is positioned between the gear housing and the rotator and receives a rotational force from the rotator. The follower has a cylindrical engaging portion provided at a center of the follower. The cylindrical engaging portion has a peripheral surface that slidably engages a peripheral surface of the support element. The switching pattern is formed in one of the gear housing and the follower. The contact terminals are formed in the other of the gear housing and the follower. The space maintaining means is provided around the support element to maintain a predetermined space between the follower and an opposing surface of the gear housing that axially opposes the follower. The control device includes a wiper switch that is switched between a stop position and an actuation position. A rotational position of the rotator is sensed through engagement and disengagement of the contact terminals with the switching pattern based on rotation of the follower. A signal indicative of the rotational position of the rotator being outputted from the rotational-position sensing device. The control device rotates the motor until the rotational-position sensing device senses a rotational position of the rotator that corresponds to a predetermined stop position of the wiper after the wiper switch is switched to the stop position to stop the windshield wiper system. The control device stops the motor when the rotational-position sensing device senses the rotational position of the rotator that corresponds to the predetermined stop position of the wiper.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Various embodiments of the present invention will be described with reference to the accompanying drawings.

First Embodiment

A windshield wiper system according to a first embodiment of the present invention will be described with reference to FIGS. 1–5.

Figure 1:
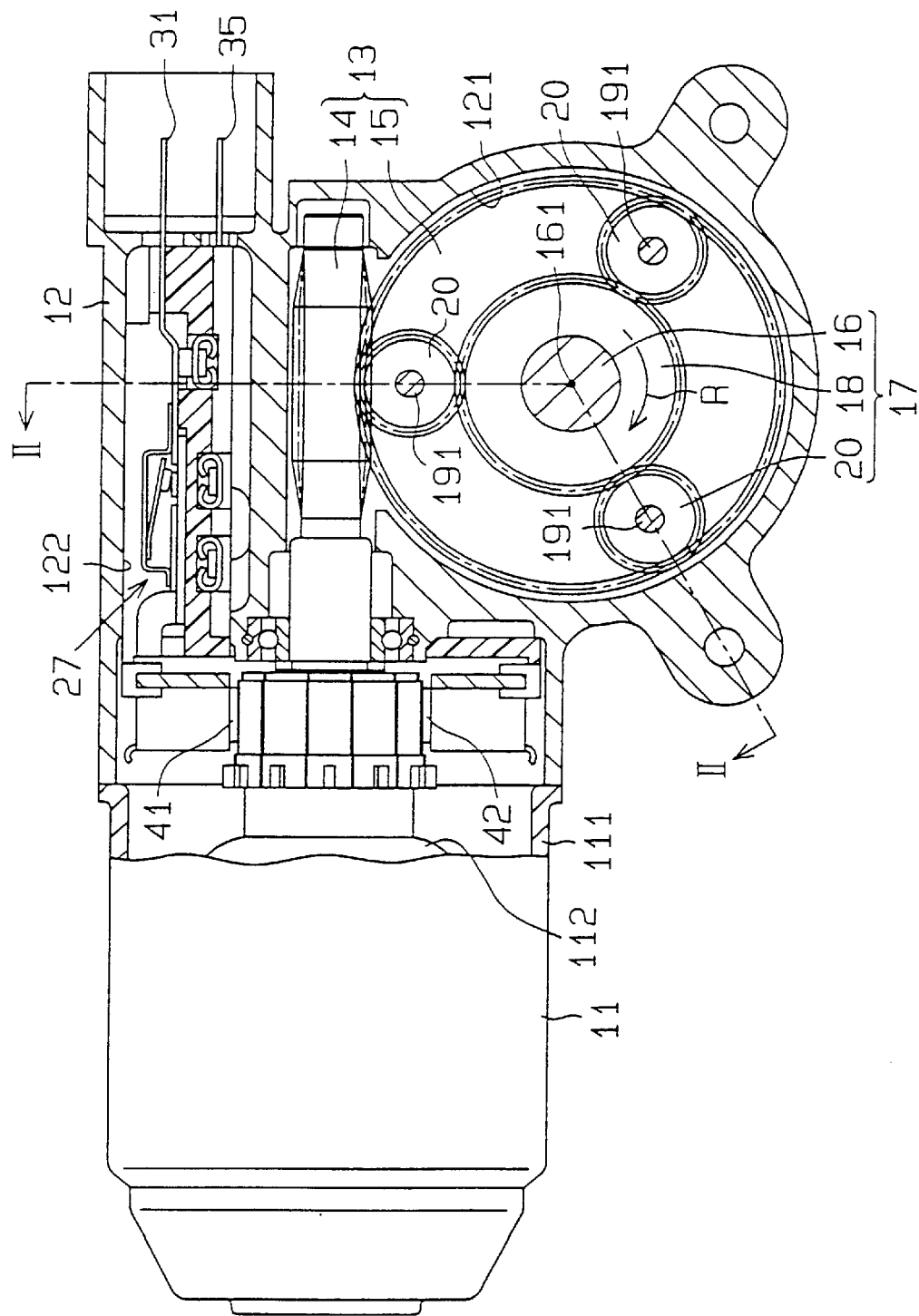
FIG. 1 is a partially cut away cross-sectional plan view of a wiper drive motor of a windshield wiper system according to a first embodiment of the present invention.

With reference to FIG. 1, a gear housing 12 is connected to a yoke housing 111 of a wiper drive motor 11. A first speed reducing gear mechanism 13 and a second speed reducing gear mechanism 17 are received within the gear housing 12. The first speed reducing gear mechanism 13 includes a worm 14 and a worm wheel 15. The worm 14 is connected to an armature 112 of the wiper drive motor 11. The worm wheel 15 is meshed with the worm 14. The worm 14 acts as an output shaft of the wiper drive motor 11. The worm wheel 15 is rotatably supported by an output shaft 16, which is, in turn, rotatably supported by the gear housing 12.

Figure 2:
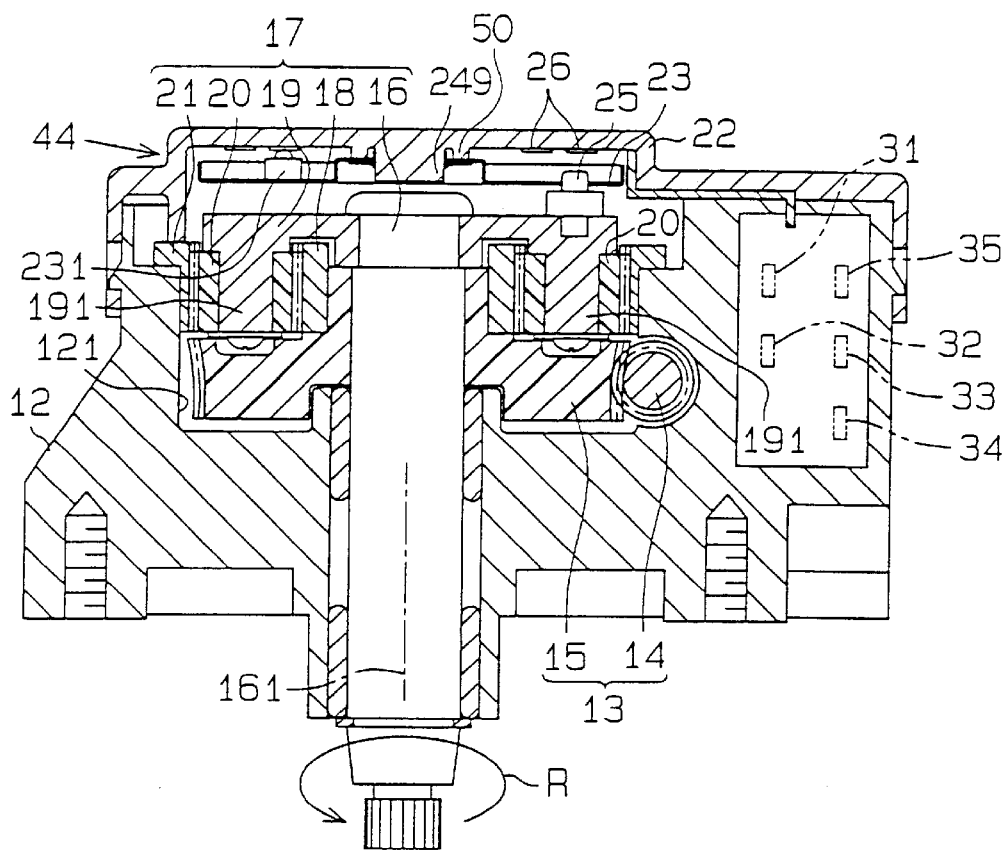
FIG. 2 is a cross-sectional view taken along line II—II in FIG. 1.

With reference to FIG. 2, the second speed reducing gear mechanism 17 is a planetary speed reducing gear mechanism including a sun gear 18, a carrier 19, a plurality (three in this embodiment, as shown in FIG. 1) of planet gears 20, an internal gear 21 and an output shaft 16. The sun gear 18 is coaxially secured to the worm wheel 15. The carrier 19 is secured to the output shaft 16 in opposed relationship with the sun gear 18. Each planet gear 20 is rotatably supported by a spindle (support element) 191 that protrudes from the carrier 19. The internal gear 21 is secured to an inner peripheral surface of a receiving recess 121 defined in the gear housing 12. The worm wheel 15 and the carrier 19 are received within the receiving recess 121. The planet gears 20 are meshed with both the sun gear 18 and internal gear 21. As the sun gear 18 rotates integrally with the worm wheel 15, the planet gears 20 revolve about the sun gear 18, and the carrier 19 rotates integrally with the output shaft 16. A rotational axis 161 of the output shaft 16 is also a rotational axis of the carrier 19. A rotational speed of the worm 14 is reduced in two steps through the first speed reducing gear mechanism 13 and the second speed reducing gear mechanism 17 before it is transmitted to the output shaft 16. The output shaft 16 and the carrier 19 rotate in a direction of an arrow R (this rotational direction is hereinafter referred to as a forward rotational direction R). The first speed reducing gear mechanism 13 and the second speed reducing gear mechanism 17 cooperatively constitute a speed reducing mechanism for transmitting the rotation of the worm 14 that acts as the output shaft of the wiper drive motor 11 at a reduced speed.

A reciprocating swing mechanism of a crank type (not shown), such as one disclosed in Japanese Unexamined Utility Model Publication No. 61-35068, U.S. Pat. No. 5,093,952 or the like which is incorporated by reference herein, is connected to the output shaft 16. Wiper arms (not shown) each having a wiper blade (not shown) are operably connected to the reciprocating swing mechanism. The wiper blades are reciprocally swung by the reciprocating swing mechanism that is, in turn, driven by the rotation of the output shaft 16. The wiper blades reciprocate once per rotation of the output shaft 16.

With reference to FIG. 2, the receiving recess 121 is covered with a cover 22 that constitutes a part of the gear housing (stationary body) 12. A cylindrical spindle 249 and an annular position-limiting ridge (position-limiting protrusion) 50 protrude from an opposing surface 221 (FIG. 3) of the cover 22 that opposes the carrier 19. The annular position-limiting ridge 50 is formed to coaxially surround the spindle 249. A follower 23 is rotatably fitted around the spindle 249. A central axis of the spindle 249 coincides with the rotational axis 161 of the output shaft 16. The follower 23 is made of an electrically conductive metal plate. The follower 23 has a circular disk shape (best seen in FIG. 4A) and includes a cylindrical engaging portion 232 that protrudes toward the cover 22 at a center of the follower 23. The cylindrical engaging portion 232 surrounds the spindle 249. The spindle 249 slidably engages an inner peripheral surface 237 of the cylindrical engaging portion 232.

The follower 23 includes an annular reinforcing wall 233 that is bent to protrude from an outer peripheral edge of the follower 23 toward the cover 22. The reinforcing wall 233 increases a rigidity of the plate-like follower 23. A portion of the follower 23 located between the reinforcing wall 233 and the cylindrical engaging portion 232 is divided into an annular disk portion 235 and a contact portion 236 by an outer cylindrical portion 234. The contact portion 236 opposes a distal end surface 501 of the position-limiting ridge 50. The cylindrical engaging portion 232, the reinforcing wall 233 and the outer cylindrical portion 234 are bent by press work.

A toothed washer 51 is fitted around an outer peripheral surface 491 of the spindle 249. The toothed washer 51 includes a tooth portion 511 and an annular flat portion 512. The tooth portion 511 is securely engaged into the outer peripheral surface 491. The annular flat portion 512 engages the contact portion 236 of the follower 23. The toothed washer 51 fitted around the spindle 249 urges the contact portion 236 of the follower 23 against the distal end surface 501 of the position-limiting ridge 50.

Figure 3:
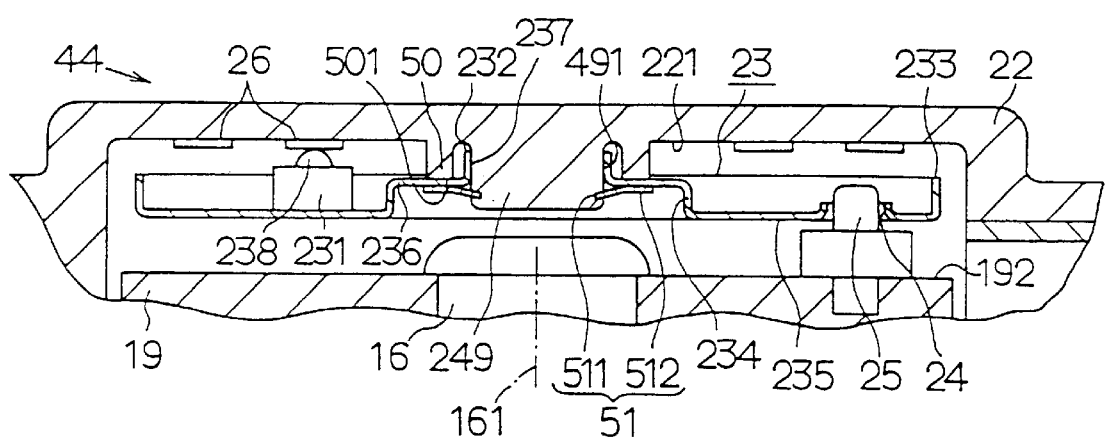
FIG. 3 is an enlarged partial cross-sectional view of the wiper drive motor according to the first embodiment, showing a rotational-position sensing device.
Figure 4A:
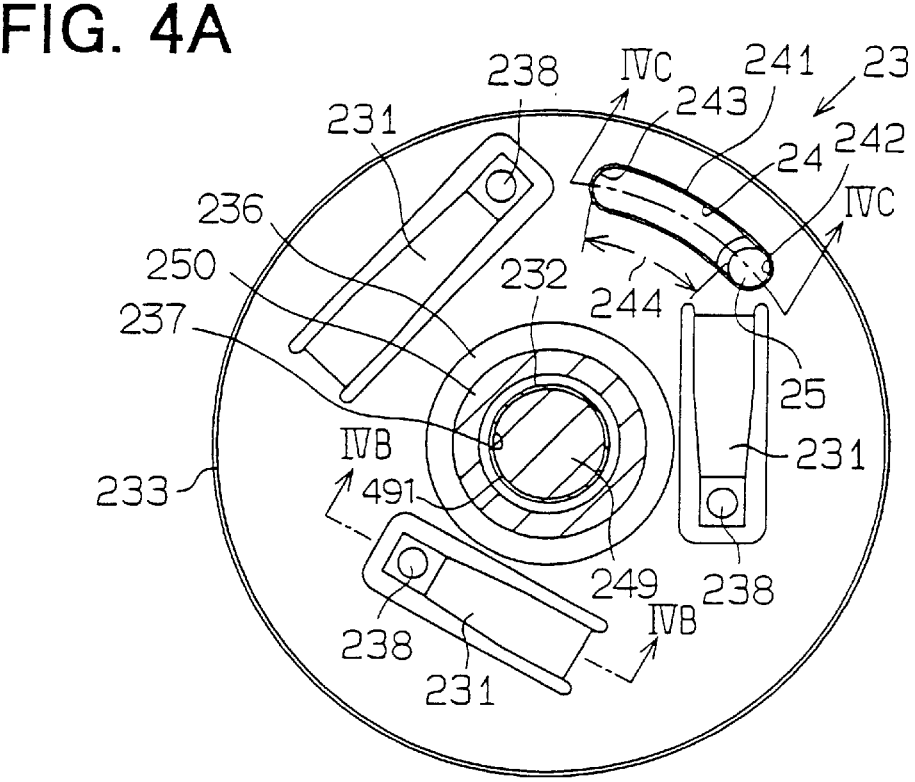
FIG. 4A is a partial cross-sectional plan view of the rotational-position sensing device according to the first embodiment.
Figure 4B:
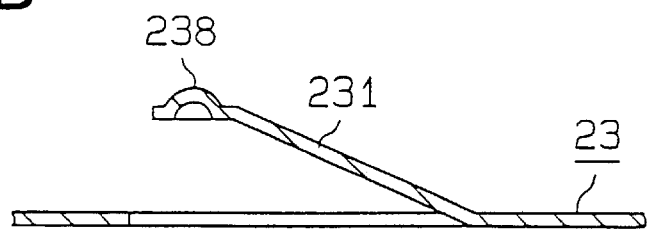
FIG. 4B is an enlarged cross-sectional view taken along line IVB—IVB in FIG. 4A.

A plurality (three in this embodiment) of lever-like contact terminals 231 are integrally formed in the follower 23. With reference to FIG. 4B, each contact terminal 231 is formed by cutting a corresponding portion of the follower 23 and then bending it toward the cover 22. A semi-spherical contact 238 is formed at a distal end of each contact terminal 231. With reference to FIGS. 3 and 4A, an engaging hole 24 penetrates through the follower 23. The engaging hole 24 is an arcuate hole extending along a circle whose center coincides with the rotational axis 161 of the output shaft 16.

With reference to FIG. 3, an engaging protrusion 25 is securely connected to an opposing surface 192 of the carrier 19 that opposes the follower 23. A distal end of the engaging protrusion 25 that rotates integrally with the carrier 19 has a cylindrical shape and is received within the engaging hole 24. With reference to FIG. 4A, an engaging wall 241 is formed by burring a corresponding portion of the follower 23 in such a manner that the engaging wall 241 protrudes from a peripheral edge of the engaging hole 24. When the carrier 19 rotates in the forward rotational direction R upon actuation of the wiper drive motor 11, the distal end of the engaging protrusion 25 engages one circumferential end 242 of the engaging hole 24 in a forward rotational engaged position. The rotation of the carrier 19 is transmitted to the follower 23 through the engagement between the engaging protrusion 25 and the circumferential end 242, so that the follower 23 is dragged to rotate about the spindle 249. When the follower 23 rotates along with the carrier 19, the inner peripheral surface 237 of the cylindrical engaging portion 232 slides along the outer peripheral surface 491 of the spindle 249, and the contact portion 236 slides along the distal end surface 501 of the position-limiting ridge 50 and the flat portion 512 of the toothed washer 51.

With reference to FIG. 3, an electrically conductive switching pattern 26 is secured to the inner surface of the cover 22 around the spindle 249. The electrically conductive switching pattern 26 is provided for sensing rotational positions corresponding to a wiping position and a stop position of the wiper blades. Each contact terminal 231 on the follower 23, which rotates along with the carrier 19, engages and disengages the switching pattern 26.

Figure 5:
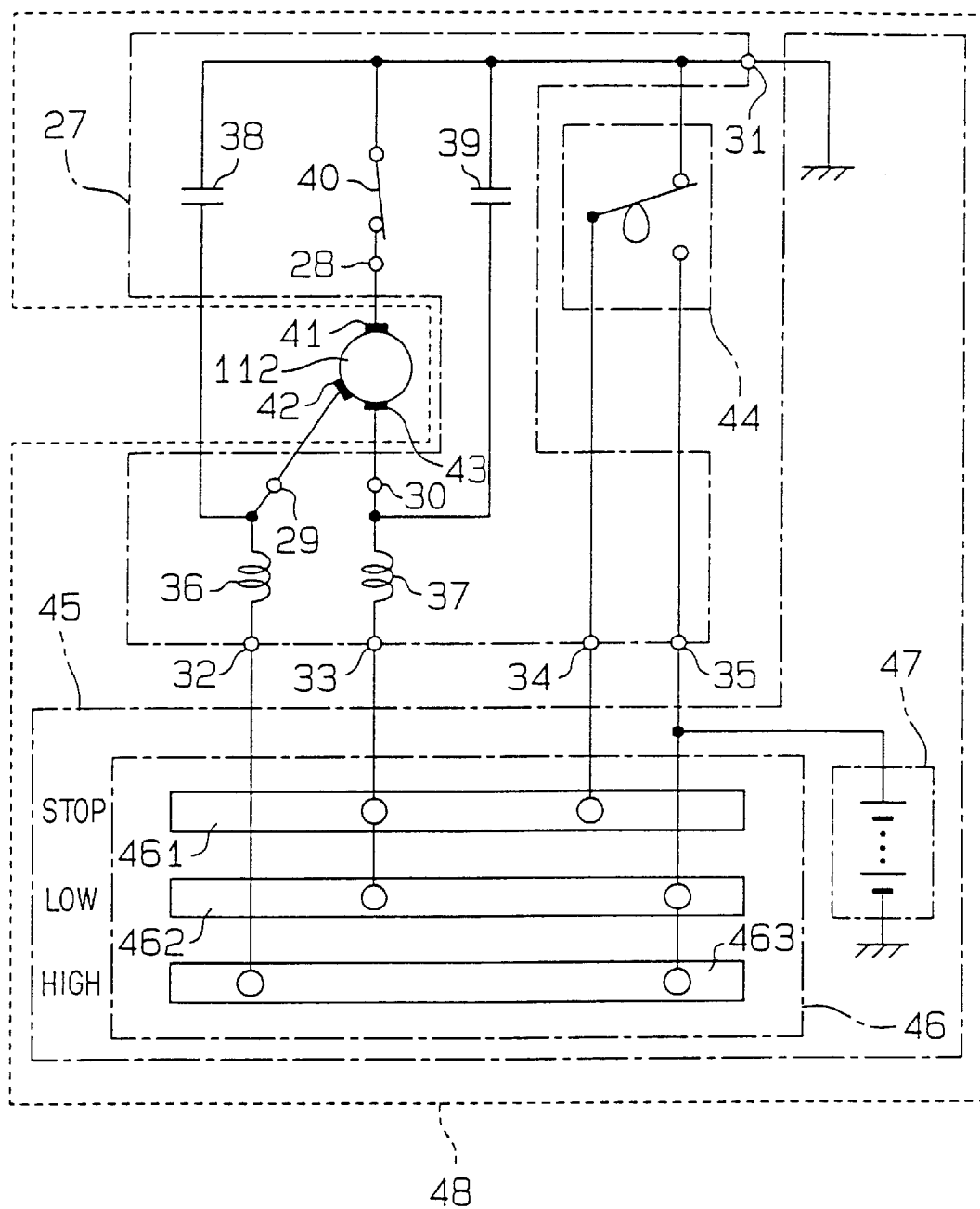
FIG. 5 is a circuit diagram of an automatic stop arrangement of the windshield wiper system according to the first embodiment.

With reference to FIG. 1, a circuit unit 27 is received within a receiving portion 122 of the gear housing 12. With reference to FIG. 5, the circuit unit 27 includes brush wiring terminals 28–30, external terminals 31–35, choke coils 36, 37, capacitors 38, 39 and a circuit breaker 40 that acts as an anti-burning means. The brush wiring terminal 28 acting as a common ground terminal is connected to the external terminal 31 through the circuit breaker 40. The brush wiring terminal 29 provided for a high speed operation is connected to the external terminal 32 through the choke coil 36. The brush wiring terminal 30 provided for a low speed operation is connected to the external terminal 33 through the choke coil 37. The circuit breaker 40 electrically disconnects the brush wiring terminal 28 from the external terminal 31 upon overheating of the choke coils 36, 37 or of the circuit breaker 40 itself.

The brush wiring terminal 28 is electrically connected to a common ground brush 41, and the brush wiring terminal 29 is electrically connected to a high speed brush 42. The brush wiring terminal 30 is electrically connected to a low speed brush 43. In FIG. 1, only the brushes 41 and 42 are depicted among the brushes 41–43.

The engagement and disengagement between the contact 238 of each contact terminal 231 and the switching pattern 26 cause electrical connection and electrical disconnection among the external terminals 31, 34 and 35. The carrier 19 provided with the engaging protrusion 25, the follower 23 provided with the engaging hole 24 and the contact terminals 231, the cover 22 provided with the switching pattern 26 constitute a rotational-position sensing device 44 for sensing or detecting a rotational position of the carrier 19 acting as a rotator. The switching pattern 26 includes first and second rotational positions of the carrier 19. The first rotational position corresponds to a predetermined stop position of the wiper blades (located within a predetermined range in a bottom section of a windshield). The second rotational position corresponds to a rotational position other than the first rotational position. When the wiper blades are in the predetermined stop position, the rotational-position sensing device 44 electrically connects the external terminal 31 to the external terminal 34. That is, the first rotational position is a specific state where the rotational-position sensing device 44 electrically connects the external terminal 31 to the external terminal 34. When the wiper blades are out of the predetermined stop position, the rotational-position sensing device 44 electrically connects the external terminal 34 to the external terminal 35. That is, the second rotational position is another specific state where the rotational-position sensing device 44 electrically connects the external terminal 34 to the external terminal 35.

With reference to FIG. 5, a control device 45 is electrically connected to the external terminals 31–35. The control device 45 includes a wiper switch 46 and a battery 47. The external terminals 32–35 are electrically connected to the wiper switch 46. The external terminal 35 is also electrically connected to a cathode of the battery 47, and the external terminal 31 is electrically connected to a ground.

The wiper switch 46 can be positioned in one of a stop position (stop mode) 461, a low speed operating position (low speed operation mode) 462 and a high speed operating position (high speed operation mode) 463. When the wiper switch 46 is positioned in the low speed operating position 462, the external terminal 33 is electrically connected to the battery 47 through the wiper switch 46. At this electrically connected state, an electric current is applied to the brush 43 through the brush wiring terminal 30, so that the armature 112 is rotated at a low speed. Thus, the wiper blades swing at the low speed.

When the wiper switch 46 is positioned in the high speed operating position 463, the external terminal 32 is electrically connected to the battery 47 through the wiper switch 46. At this electrically connected state, the electric current is applied to the brush 42 through the brush wiring terminal 29, so that the armature 112 is rotated at a high speed. Thus, the wiper blades swing at the high speed.

If the wiper blades are out of the predetermined stop position when the wiper switch 46 is shifted from the low speed operating position (low speed actuation position) 462 or the high speed operating position (high speed actuation position) 463 to the stop position 461, the rotational-position sensing device 44 senses the second rotational position and electrically connects the external terminal 34 to the external terminal 35. Then, the electric current is applied to the brush 43 through the rotational-position sensing device 44 and the wiper switch 46, so that the wiper drive motor 11 is operated at the low speed, and the wiper blades wipe the windshield at the low speed. When the wiper blades stop at the predetermined stop position, the rotational-position sensing device 44 senses the first rotational position and electrically connects the external terminal 31 to the external terminal 34. That is, when the wiper switch 46 is in the stop position 461 while the external terminal 31 is electrically connected to the external terminal 34 through the rotational-position sensing device 44, there is provided a closed-loop circuit proceeding in the following order: the external terminal 31; the rotational-position sensing device 44; the external terminal 34; the wiper switch 46; the external terminal 33; the choke coil 37; the brush 43; windings of the armature 112; the brush 41; the circuit breaker 40 and the external terminal 31. Thus, an electrical braking force is applied to the armature 112, so that the rotation of the armature 112 is stopped. As a result, the wiper blades automatically stop in the predetermined stop position.

The wiper switch 46, the battery 47, the circuit unit 27 and the rotational-position sensing device 44 constitute an automatic stop arrangement 48 for automatically stops the wiper blades in the predetermined stop position.

For instance, it will be assumed that a relatively large amount of snow is present on the windshield. The wiper blades wipe the snow toward the predetermined stop position. When the wiper blades reach the predetermined stop position, the wiper drive motor is turned off, so that the wiper blades lose its driving force. Since the snow has been packed by the wiper blades, the snow exerts a reaction force against the wiper blades to move the wiper blades backward out of the predetermined stop position, and the wiper drive motor 11 is forced to rotate backward. When such backward rotation of the wiper drive motor 11 occurs, and the follower 23 is rotated backward, the external terminal 31 can be disconnected from the external terminal 34, and the external terminal 34 can be electrically connected to the external terminal 35. Thus, the electric current may be applied to the brush 43, so that wiper blades are urged toward the predetermined stop position by the wiper drive motor 11. This causes chattering of the wiper system.

Figure 4C:
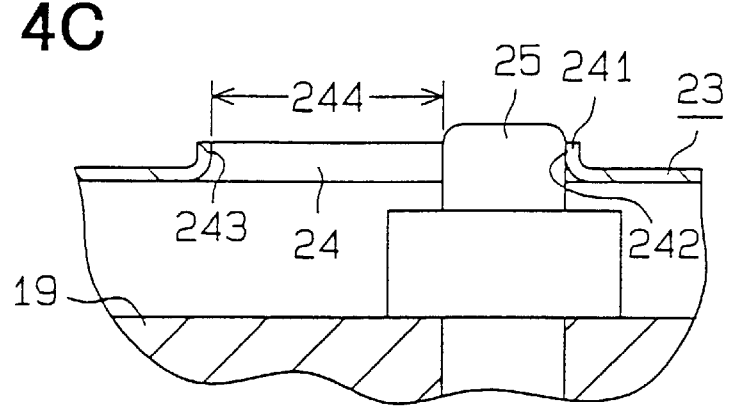
FIG. 4C is an enlarged cross-sectional view taken along line IVC—IVC in FIG. 4A.

However, in the present embodiment, with reference to FIG. 4C, a play 244 is provided in the engaging hole 24, so that the engaging protrusion 25 can move within a range of play 244 within the engaging hole 24. By way of example, it will be assumed that the engaging protrusion 25 is engaged with the circumferential end 242 of the engaging hole 24, i.e., the follower 23 can be immediately rotated upon rotation of the carrier 19 in the forward rotational direction R without a pause. In this state, if the wiper drive motor 11 is forced to rotate backward, the engaging protrusion 25 is relatively moved from the one circumferential end 242 toward the other circumferential end 243 within the engaging hole 24. Thus, when the wiper drive motor 11 is forced to rotate backward, the follower 23 will not be rotated backward by the backward rotation of the carrier 19 or of the wiper drive motor 11 unless the engaging protrusion 25 moves all the way through the range of play 244 within the engaging hole 24. As a result, the rotational-position sensing device 44 acting as a part of the automatic stop arrangement 48 can prevent chattering of the windshield wiper system without changing the state of engagement and disengagement between the switching pattern 26 and each contact terminal 231.

The first embodiment provides the following advantages.

(1-1) The annular position-limiting ridge 50 limits the position of the contact portion 236 of the follower 23 around the spindle 249 in such a manner that the contact portion 236 of the follower 23 is prevented from moving toward the opposing surface 221 of the cover 22 that axially opposes the follower 23. The toothed washer 51 limits the position of the contact portion 236 of the follower 23 around the spindle 249 in such a manner that the contact portion 236 of the follower 23 is prevented from moving toward the carrier 19. Thus, the position-limiting ridge 50 and the toothed washer 51 constitute a space maintaining means for maintaining a predetermined space between the follower 23 and the switching pattern 26 (or between the follower 23 and the opposing surface 221 of the cover 22). The cylindrical engaging portion 232 acts as an engaging means for engaging the follower 23 with the spindle 249 while allowing relative rotation therebetween. The position-limiting action of the position-limiting ridge 50 against the contact portion 236 of the follower 23 and the position-limiting action of the toothed washer 51 against the contact portion 236 of the follower 23 restrain the follower 23 from moving in the axial direction relative to the spindle 249 throughout the entire peripheral surface of the spindle 249. Movement of the follower 23 in a radial direction of the spindle 249 is restrained by the position-limiting action that is achieved through the engagement between the cylindrical engaging portion 232 and the spindle 249, more specifically the engagement between the cylindrical engaging portion 232 and the outer peripheral surface 491 of the spindle 249. Furthermore, the engagement between the cylindrical engaging portion 232 and the spindle 249 restrains tilt of the cylindrical engaging portion 232 relative to the spindle 249. The position-limiting action of the position-limiting ridge 50, the position-limiting action of the toothed washer 51 and the position-limiting action of the cylindrical engaging portion 232 cooperate together to effectively restrain the tilt of the follower 23.

Besides the follower 23, the toothed washer 51 is the only component to be fitted around the spindle 249. Thus, in comparison to the rotational-position sensing device disclosed in Japanese Unexamined Utility Model Publication No. 61-35068, the number of the assembling steps and the number of the components to be assembled are reduced in accordance with the present embodiment.

(1-2) The inner peripheral surface 237 of the cylindrical engaging portion 232 that limits the tilt of the follower 23 slidably engages the outer peripheral surface 491 of the spindle 249. The sliding engagement between the inner peripheral surface 237 and the outer peripheral surface 491 is effective to restrain frictional abrasion of the slidingly engaged portions of the inner peripheral surface 237 and the outer peripheral surface 491. The cylindrical engaging portion 232 is the preferred engaging means for restraining the frictional abrasion.

(1-3) It is preferred that a frictional resistance between the cover 22 acting as the stationary body and the follower 23 is kept as small as possible. The annular position-limiting ridge 50 surrounds the spindle 249 in close proximity to the spindle 249, so that a frictional resistance between the distal end surface 501 of the position-limiting ridge 50 and the contact portion 236 is relatively small. The position-limiting ridge 50 is formed in the opposing surface 221 of the cover 22 in such a manner that the position-limiting ridge 50 restrains the tilt of the follower 23. This position-limiting ridge 50 can be conveniently and effectively used as the space maintaining means.

(1-4) The distal end surface 501 of the position-limiting ridge 50 substantially, uniformly engages with the contact portion 236 of the follower 23 around the spindle 249, so that the frictional resistance between the position-limiting ridge 50 and the follower 23 becomes substantially uniform throughout an entire rotational angle of the follower 23 around the spindle 249. The uniformity of the frictional resistance is effective to allow smooth rotation of the follower 23. The annular position-limiting ridge 50 is effective to unify the frictional resistance between the distal end surface 501 of the position-limiting ridge 50 and the follower 23 throughout the entire rotational angle of the follower 23.

(1-5) The toothed washer 51 urges the contact portion 236 of the follower 23 against the distal end surface 501 of the position-limiting ridge 50. The contact portion 236 is clamped between the flat portion 512 of the toothed washer 51 and the distal end surface 501 by an urging force exerted from the toothed washer 51. The follower 23, which is clamped between the flat portion 512 of the toothed washer 51 and the distal end surface 501, is restrained from movement in the axial direction of the spindle 249 around the spindle 249. The above structure in which the flat contact portion 236 is clamped between the flat distal end surface 501 and the flat portion 512 effectively restrains the tilt of the contact portion 236 or the tilt of the follower 23.

(1-6) The cylindrical engaging portion 232, the reinforcing wall 233, the outer cylindrical portion 234, the contact terminals 231 and the like of the follower 23 are easily manufactured from a circular electrically conductive metal disk by the press work. The follower 23 made of the metal material allows easy manufacturing of the cylindrical engaging portion 232, the reinforcing wall 233, the outer cylindrical portion 234, the contact terminals 231 and the like.

(1-7) The cylindrical engaging portion 232, the reinforcing wall 233 and the outer cylindrical portion 234 are effective to improve a rigidity of the follower 23.

(1-8) The automatic stop arrangement 48 includes the rotational-position sensing device 44 that is effective to restrain the tilt of the follower 23. The automatic stop arrangement 48 can be particularly, effectively used in the windshield wiper system that requires adequate stop of the wipers in the predetermined stop position. Thus, the rotational-position sensing device 44 of the present invention can be advantageously used in the windshield wiper system having the automatic stop arrangement including the rotational-position sensing device as a part of the automatic stop arrangement.

(1-9) The state of engagement and disengagement between the switching pattern 26 and each contact terminal 231 is not changed by the backward rotation of the carrier 19 as long as the engaging protrusion 25 acting as a driving-side engaging means provided in the carrier 19 is within the range of play 244 of the engaging hole 24. Each contact terminal 231 formed in the metal follower 23 having the engaging hole 24 is integrally formed in the follower 23 by cutting and bending a corresponding portion of the follower 23. The engaging hole 24 acting as a driven-side engaging means formed in the metal follower 23 is integrally formed in the follower 23 by die-cutting. Thus, the number of components of the rotational-position sensing device 44 can be reduced in comparison to the previously proposed one.

(1-10) The engaging hole 24 penetrating through the metal follower 23 is easily manufactured by the die-cutting. The high manufacturability of the engaging hole 24 contributes to a high manufacturability of the rotational-position sensing device 44.

(1-11) If the engaging protrusion 25 is made of a resin material, it is important to restrain frictional abrasion of the engaging protrusion 25 that engages the engaging hole 24 of the metal follower 23. The larger the engaging surface area between the engaging protrusion 25 and the engaging hole 24, the smaller the frictional abrasion of the actually engaging area of the engaging protrusion 25 that actually engages the peripheral edge of the engaging hole 24. The engaging protrusion 25 engages the circumferential end 242 of the engaging wall 241 formed by burring. The engaging wall 241 is effective to increase the engaging surface area between the engaging protrusion 25 and the peripheral edge of the engaging hole 24. Thus, the engaging wall 241 formed by burring is effective to restrain the frictional abrasion of the engaging protrusion 25. Although burring of the engaging wall 241 is generally performed after the die-cutting of the engaging hole 24, the burring of the engaging wall 241 can be concurrently performed along with the die-cutting of the engaging hole 24.

(1-12) The engaging hole 24 is an arcuate hole extending along a circle whose center coincides with the rotational axis 161 of the carrier 19. A radial width of the engaging hole 24 measured in a radial direction of the follower 23 only needs to be slightly larger than a diameter of the engaging protrusion 25 to allow the smooth relative movement of the engaging protrusion 25 within the engaging hole 24. That is, the radial width of the engaging hole 24 only needs to be slightly larger than a width of a path of the engaging protrusion 25 observed during the relative movement of the engaging protrusion 25. It is preferred that a size of the engaging hole 24 is kept as small as possible to establish a sufficient rigidity of the follower 23. It is also preferred that the rotatable amount of the carrier 19 in the backward rotational direction without causing dragging of the follower 23 is kept as large as possible in order to prevent chattering of the windshield wiper system with greater security. The rotatable amount of carrier 19 in the backward rotational direction without causing the dragging of the follower 23 largely depends on the amount of the play 244. The arcuate engaging hole 24 is effective to increase the amount of the play 244 while minimizing the size of the engaging hole 24.

(1-13) The cutting and bending work of each contact terminal 231 is convenient to integrally form the contact terminals 231 in the metal follower 23.

(1-14) The engaging protrusion 25 is received within the engaging hole 24 and engages the circumferential end 242 of the engaging hole 24. This arrangement in which the engaging protrusion 25 is received within the engaging hole 24 allows a reduction in a size of the rotational-position sensing device 44 in the axial direction of the rotational axis 161. This is due to the fact that a portion of a height of engaging hole 24 is located within a thickness of the follower 23.

(1-15) The automatic stop arrangement 48 that includes the rotational-position sensing device 44 can be particularly effectively used in the windshield wiper system that is prone to encounter the backward rotation of the wiper drive motor 11. Thus, the rotational-position sensing device 44 of the present invention can be advantageously used in the windshield wiper system having the automatic stop arrangement including the rotational-position sensing device as a part of the automatic stop arrangement.

Second Embodiment

Figure 6:
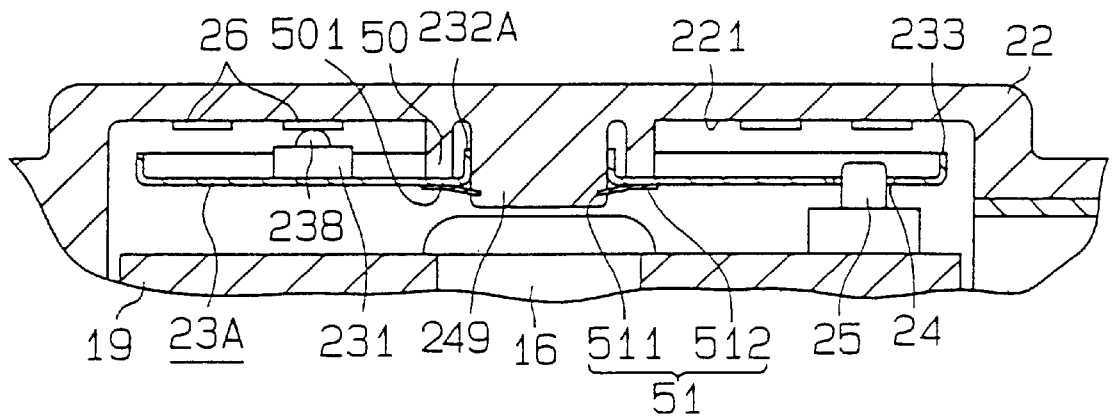
FIG. 6 is a partial longitudinal cross-sectional view of a rotational-position sensing device according to a second embodiment of the present invention.

A second embodiment of the present invention will be described with reference to FIG. 6. The components similar to those of the first embodiment will be indicated by similar numerals in the following description.

A protruding height of the spindle 249 and a protruding height of the position-limiting ridge 50 are increased from those of the first embodiment, and a length of a cylindrical engaging portion 232A of a follower 23A is increased from that of the first embodiment. A portion of the follower 23A arranged between the reinforcing wall 233 and the cylindrical engaging portion 232A is generally flat.

In the second embodiment, advantages similar to those described in the above sections (1-1), (1-2), (1-4)-(1-6) and (1-8) of the first embodiment are achieved. The above arrangement in which the length of the cylindrical engaging portion 232A is increased from that of the first embodiment further improves the advantage of the restraining the tilt of the cylindrical engaging portion 232A with respect to the spindle 249 in comparison to that of the first embodiment.

Third Embodiment

Figure 7:
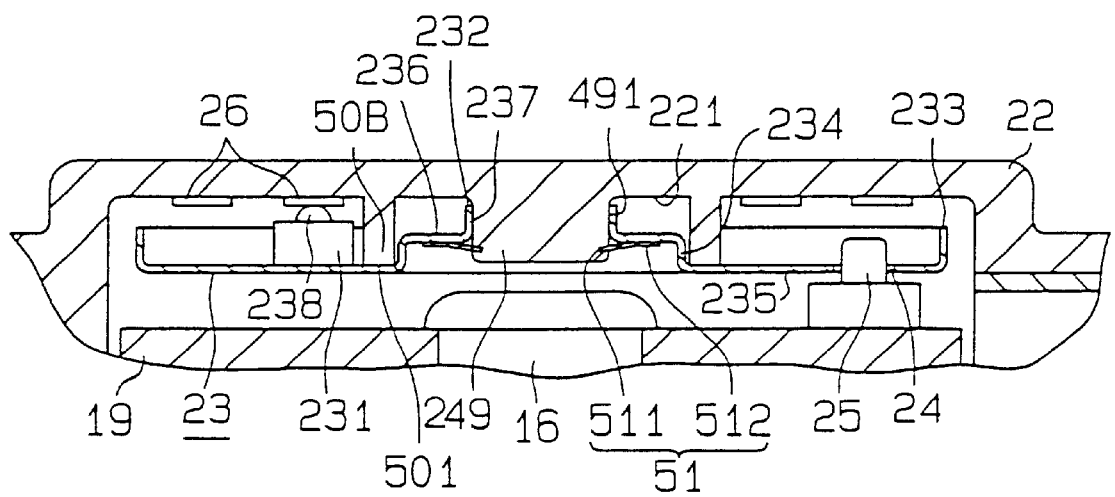
FIG. 7 is a partial longitudinal cross-sectional view of a rotational-position sensing device according to a third embodiment of the present invention.

A third embodiment of the present invention will be described with reference to FIG. 7. The components similar to those of the first embodiment will be indicated by similar numerals in the following description.

A position-limiting ridge 50B surrounds the outer cylindrical portion 234, and a distal end surface 501 of the position-limiting ridge 50B slidably engages the annular disk portion 235. The flat portion 512 of the toothed washer 51 slidably engages the contact portion 236.

In the third embodiment, advantages similar to those described in the above sections (1-1), (1-2), (1-4), (1-6)-(1-8) are achieved.

Fourth Embodiment

Figure 8A:
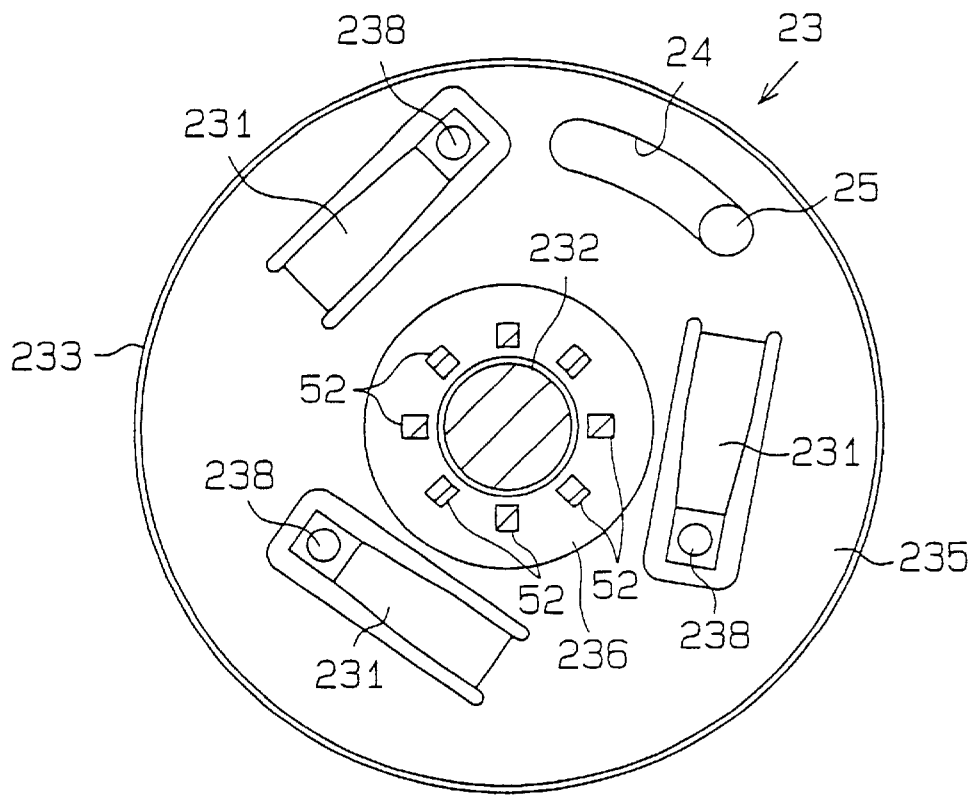
FIG. 8A is a partial cross-sectional plan view of a rotational-position sensing device according to a fourth embodiment of the present invention.
Figure 8B:
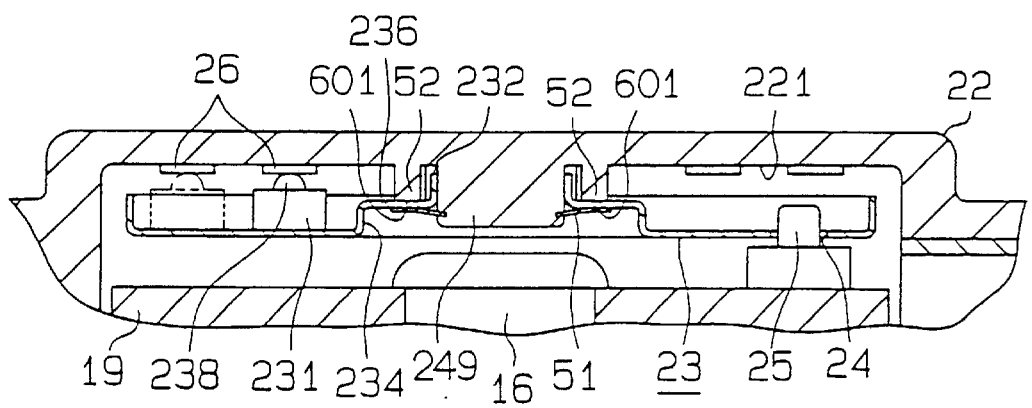
FIG. 8B is a partial longitudinal cross-sectional view of the rotational-position sensing device according to the fourth embodiment.

A fourth embodiment of the present invention will be described with reference to FIGS. 8A and 8B. The components similar to those of the first embodiment will be indicated by similar numerals in the following description.

A plurality of position-limiting protrusions 52 protrude from the opposing surface 221 of the cover 22. The position-limiting protrusions 52 are arranged in a circle around the spindle 249, and a distal end surface 601 of each position-limiting protrusion 52 slidably engages the contact portion 236. The position-limiting protrusions 52 provide functions that are similar to those described with reference to the position-limiting ridge 50 of the first embodiment.

Fifth Embodiment

Figure 9A:
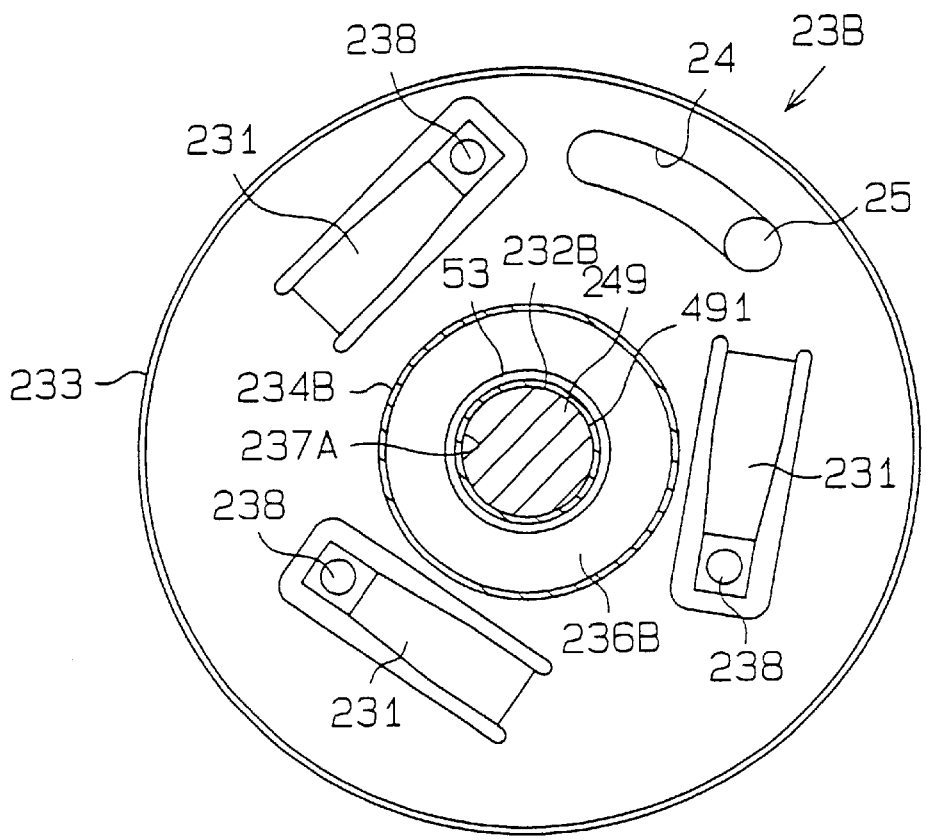
FIG. 9A is a partial cross-sectional plan view of a rotational-position sensing device according to a fifth embodiment of the present invention.
Figure 9B:
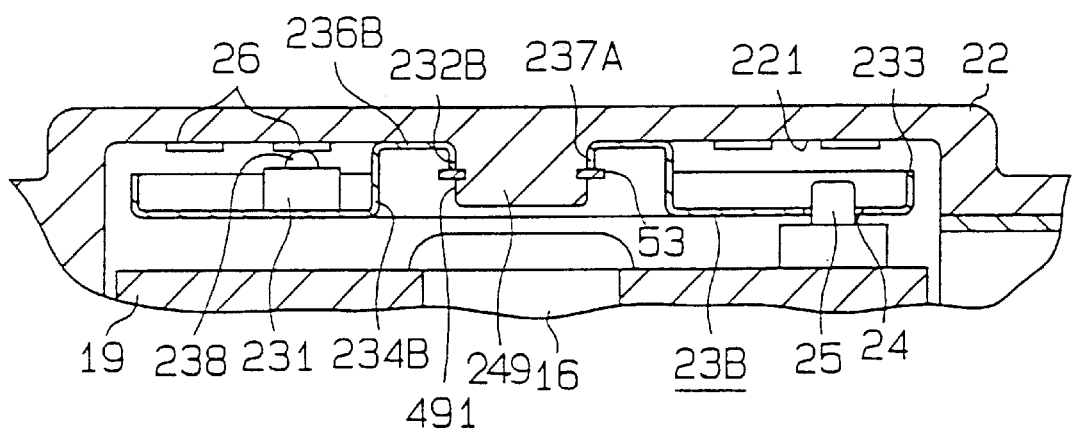
FIG. 9B is a partial longitudinal cross-sectional view of the rotational-position sensing device according to the fifth embodiment.

A fifth embodiment of the present invention will be described with reference to FIGS. 9A and 9B. The components similar to those of the first embodiment will be indicated by similar numerals in the following description.

A cylindrical engaging portion 232B of a follower 23B protrudes toward the carrier 19. An inner peripheral surface 237A of the cylindrical engaging portion 232B slidably engages the outer peripheral surface 491 of the spindle 249. A contact portion 236B slidably engages the opposing surface 221 of the cover 22. A ring-shaped engaging element 53 is engaged around the outer peripheral surface 491 of the spindle 249, and the distal end surface of the cylindrical engaging portion 232B slidably engages the ring-shaped engaging element 53. The outer cylindrical portion 234B, the contact portion 236B and the engaging element 53 constitute the space maintaining means.

In the fifth embodiment, advantages similar to those described in the above sections (1-1)-(1-3), (1-6)-(1-8) of the first embodiment are achieved.

Sixth Embodiment

Figure 10A:
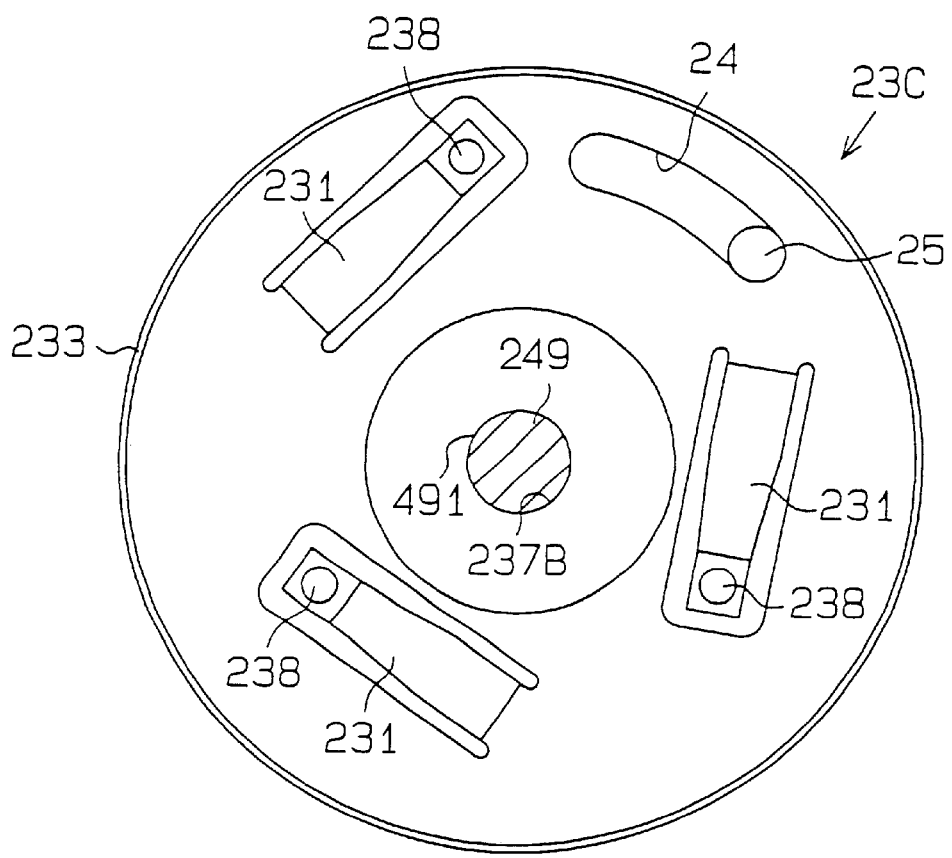
FIG. 10A is a partial cross-sectional plan view of a rotational-position sensing device according to a sixth embodiment of the present invention.
Figure 10B:
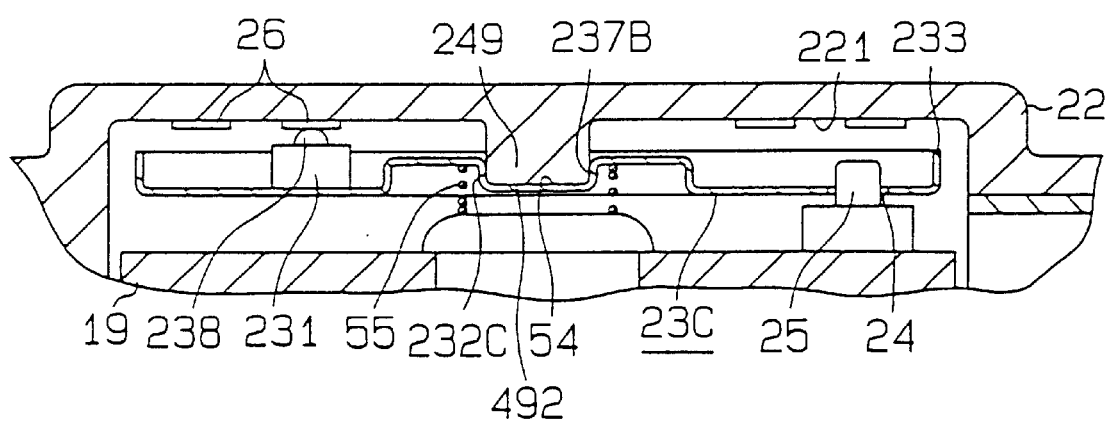
FIG. 10B is a partial longitudinal cross-sectional view of the rotational-position sensing device according to the sixth embodiment.

A sixth embodiment of the present invention will be described with reference to FIGS. 10A and 10B. The components similar to those of the first embodiment will be indicated by similar numerals in the following description.

In a follower 23C, a spindle supporting recess 54 is recessed toward the carrier 19, and the spindle 249 is fitted within the spindle supporting recess 54. A peripheral wall of the spindle supporting recess 54 constitutes a cylindrical engaging portion 232C that protrudes toward the carrier 19. A compression spring 55 is held between the follower 23C and the carrier 19. The compression spring 55 urges the follower 23C toward the cover 22. A bottom inner surface of the spindle supporting recess 54 slidably engages a distal end surface 492 of the spindle 249, and an inner peripheral surface 237B of the cylindrical engaging portion 232C slidably engages the outer peripheral surface 491 of the spindle 249. The spindle 249 and the compression spring 55 constitute the space maintaining means.

In the sixth embodiment, advantages similar to those described in the first embodiment are achieved.

Seventh Embodiment

Figure 11:
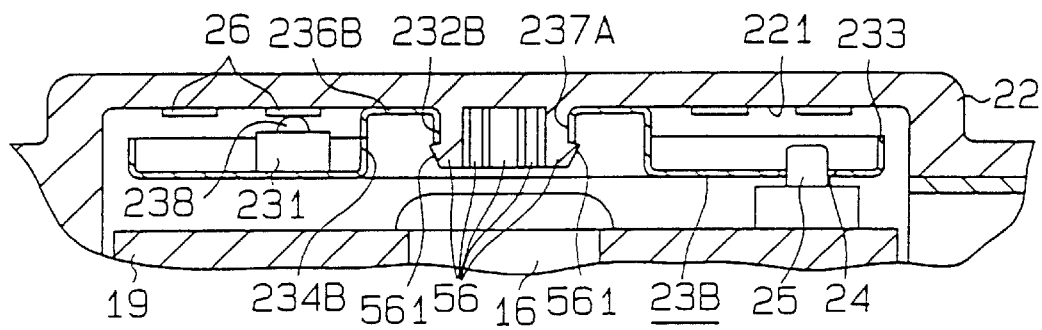
FIG. 11 is a partial longitudinal cross-sectional view of a rotational-position sensing device according to a seventh embodiment of the present invention.

A seventh embodiment of the present invention will be described with reference to FIG. 11. The components similar to those of the fifth embodiment will be indicated by similar numerals in the following description.

A plurality of spindle constituting pieces 56 protrude from the opposing surface 221 of the cover 22. Spindle constituting pieces 56 are arranged in a circle to form a spindle for the follower 23B. A hook 561 is formed at a distal end of each spindle constituting piece 56. The spindle composed of the spindle constituting pieces 56 is inserted within the cylindrical engaging portion 232B while the spindle constituting pieces 56 are resiliently deformed. The inner peripheral surface 237A of the cylindrical engaging portion 232B of the follower 23B slidably engages the lateral surfaces of the spindle constituting pieces 56. A distal end of the cylindrical engaging portion 232B slidably engages the hooks 561. The hooks 561 constitute the space maintaining means.

In the seventh embodiment, advantages similar to those described in the fifth embodiment are achieved.

Eighth Embodiment

Figure 12:
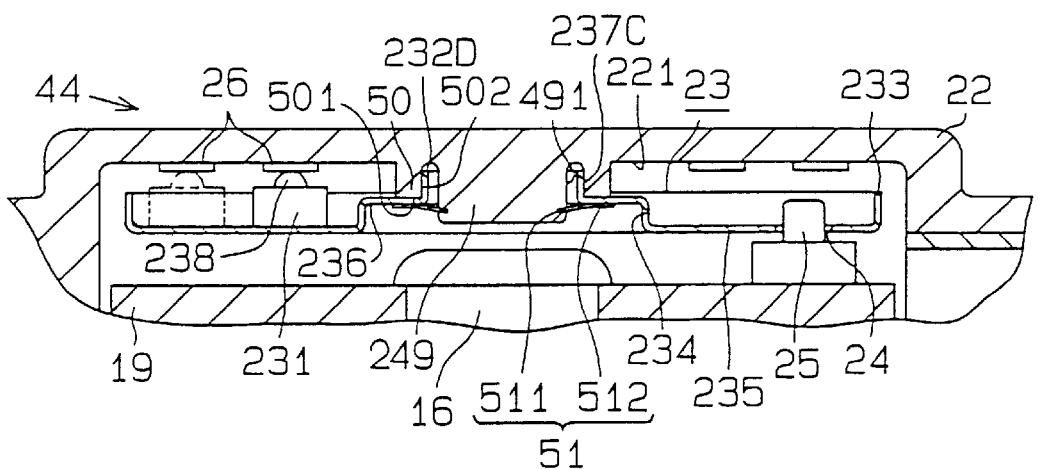
FIG. 12 is a partial longitudinal cross-sectional view of a rotational-position sensing device according to an eighth embodiment.

An eighth embodiment of the present invention will be described with reference to FIG. 12. The components similar to those of the first embodiment will be indicated by similar numerals in the following description.

A cylindrical engaging portion 232D of the follower 23 has an inner diameter larger than an outer diameter of the spindle 249. The cylindrical engaging portion 232D of the follower 23 is fitted to the annular position-limiting ridge 50 in such a manner that an outer peripheral surface 237c of the cylindrical engaging portion 232D slidably engages the inner peripheral surface 502 of the position-limiting ridge 50. That is, the position-limiting ridge 50 of the present embodiment constitutes the space maintaining means for maintaining a predetermined space between the follower 23 and the switching pattern 26 and also constitutes a support element for rotatably supporting the follower 23.

Ninth Embodiment

Figure 13A:
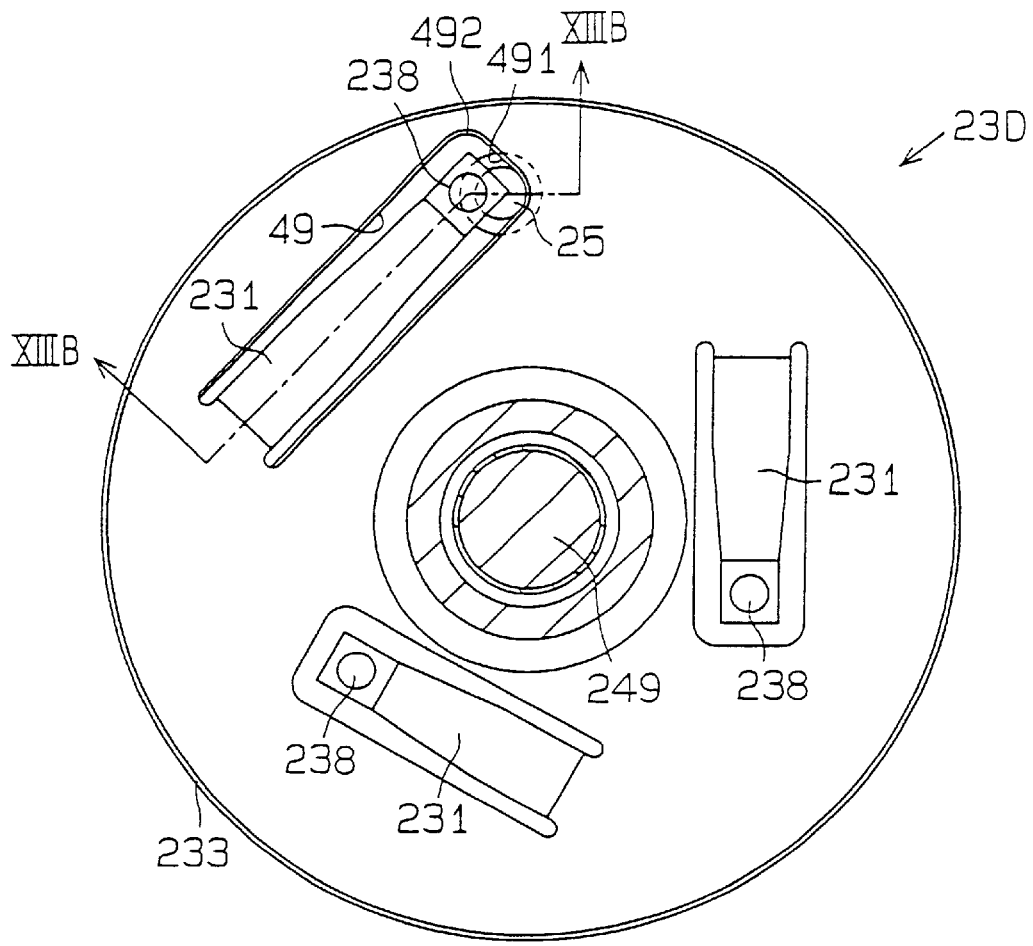
FIG. 13A is a partial cross-sectional plan view of a rotational-position sensing device according to a ninth embodiment of the present invention.
Figure 13B:
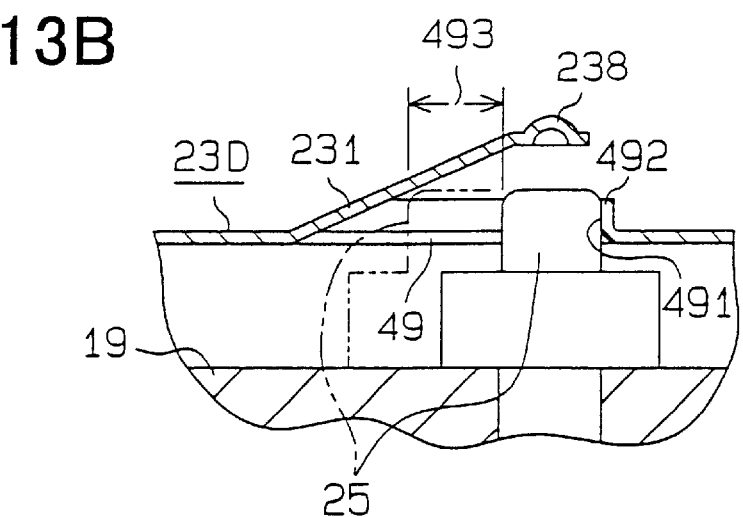
FIG. 13B is an enlarged cross-sectional view taken along line XIIIB—XIIIB in FIG. 13A.

A ninth embodiment of the present invention will be described with reference to FIGS. 13A and 13B. The components similar to those of the first embodiment will be indicated by similar numerals in the following description.

A follower 23D of the present embodiment does not have the engaging hole 24 of the first embodiment. The engaging protrusion 25 is received in a residual hole 49 that is left after cutting and bending of the contact terminal 231. The engaging protrusion 25 engages one end 491 of the residual hole 49 upon rotation of the carrier 19 in the forward rotation R. A play 493 is provided in the residual hole 49, and the engaging protrusion 25 can move within a range of play 493 within the residual hole 49. An engaging wall 492 is formed by burring a corresponding portion of the follower 23D in such a manner that the engaging wall 492 protrudes along a peripheral edge of the residual hole 49 that acts as a driven-side engaging means.

In the ninth embodiment, advantages similar to those described in the above sections (1-9), (1-11) and (1-13)-(1-15) of the first embodiment are achieved. The residual hole 49 that is formed by cutting and bending of the contact terminal 231 can be conveniently and effectively used as an engaging recess for engaging with the engaging protrusion 25. Furthermore, the use of the residual hole 49 as the engaging recess allows elimination of a dedicated engaging hole for engaging with the engaging protrusion 25, so that a total size of the holes present in the follower 23D is reduced in comparison to that of the first embodiment. Thus, a strength of the follower 23D of the ninth embodiment is greater than that of the follower 23 of the first embodiment.

Tenth Embodiment

Figure 14A:
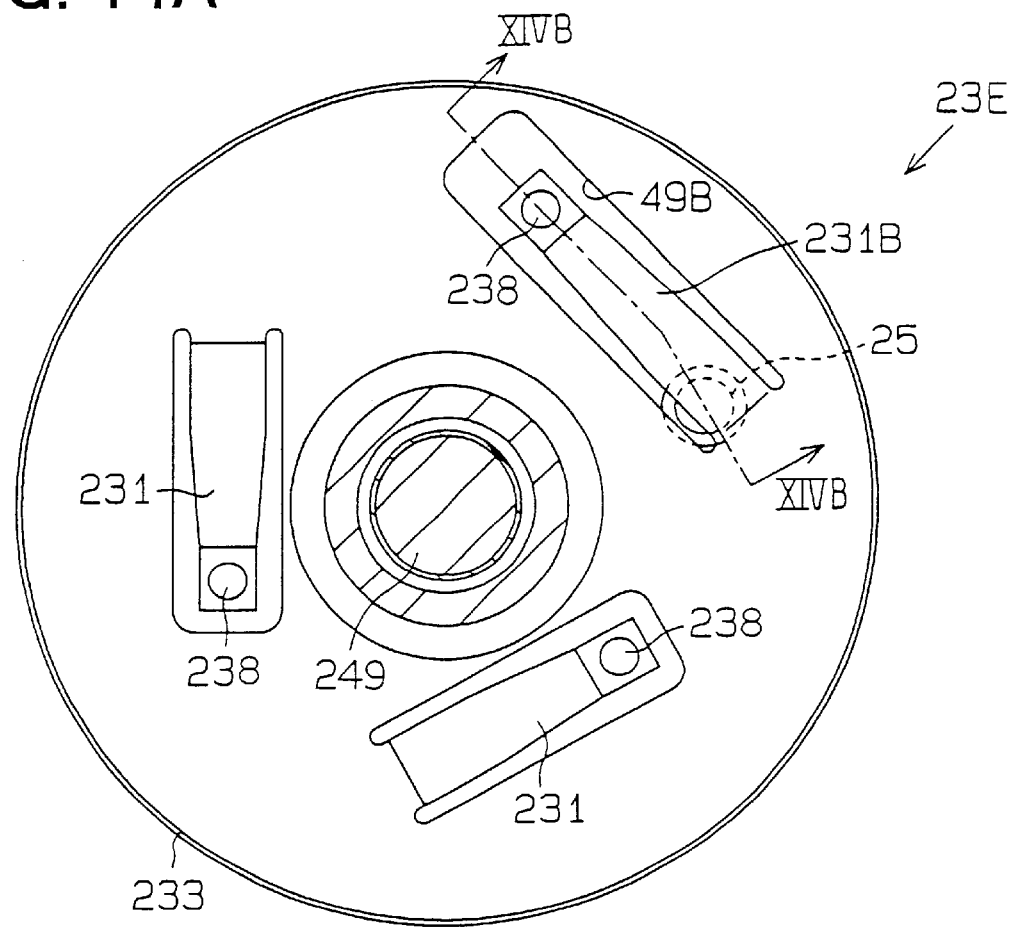
FIG. 14A is a partial cross-sectional plan view of a rotational-position sensing device according to a tenth embodiment of the present invention.
Figure 14B:
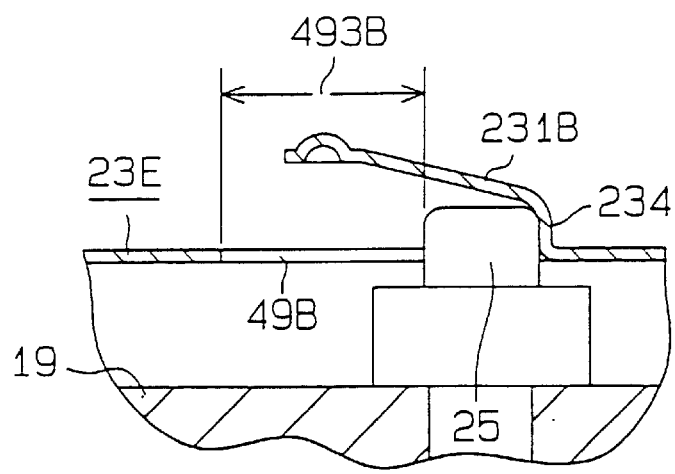
FIG. 14B is a cross-sectional view taken along line XIVB—XIVB in FIG. 14A.

A tenth embodiment of the present invention will be described with reference to FIGS. 14A and 14B. The components similar to those of the ninth embodiment will be indicated by similar numerals in the following description.

A follower 23E of the present embodiment does not have the engaging hole 24 of the first embodiment. The engaging protrusion 25 is received in a residual hole 49B that is formed after cutting and bending of a contact terminal 231B. A play 493B is provided in the residual hole 49B that acts as the driven-side engaging means, and the engaging protrusion 25 can move within a range of play 493B within the residual hole 49B. A base 234 of the contact terminal 231B vertically protrudes, and the engaging protrusion 25 engages the base 234 of the contact terminal 231B upon the rotation of the carrier 19 in the forward rotational direction R.

In the tenth embodiment, advantages similar to those described in the above sections (1-9), (1-11) and (1-13)–(1-

15) of the first embodiment and those of the ninth embodiment are achieved. The base 234 provides functions similar to those of the engaging walls 241 and 492 formed by burring in the first and ninth embodiments, respectively. Thus, the step of forming the engaging wall by burring along the peripheral edge of the residual hole 49B can be eliminated.

Eleventh Embodiment

Figure 15A:
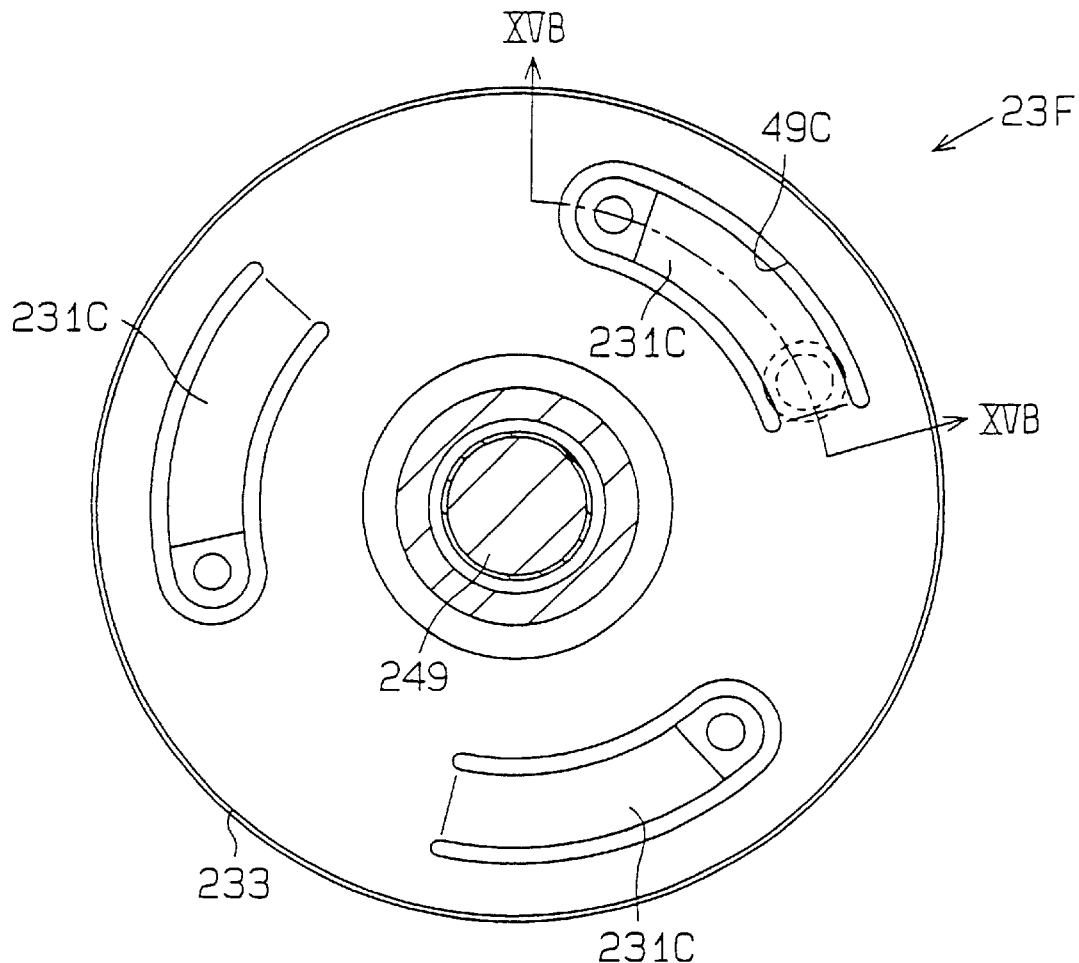
FIG. 15A is a partial cross-sectional plan view of a rotational-position sensing device according to an eleventh embodiment of the present invention.
Figure 15B:
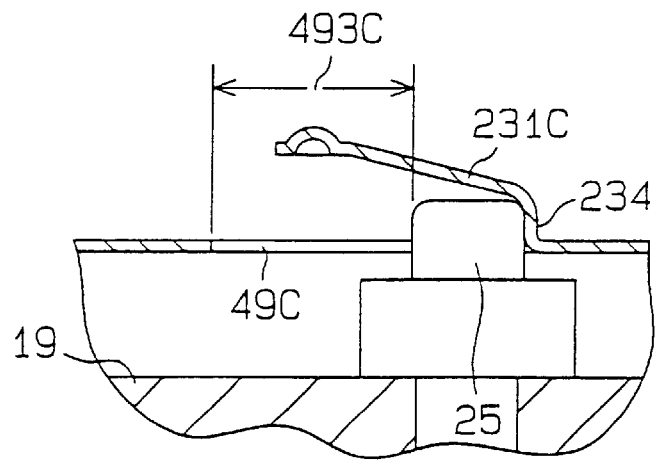
FIG. 15B is a cross-sectional view taken along line XVB—XVB in FIG. 15A.

An eleventh embodiment of the present invention will be described with reference to FIGS. 15A and 15B. The components similar to those of the tenth embodiment will be indicated by similar numerals in the following description.

A follower 23F of the present embodiment does not have the engaging hole 24 of the first embodiment. The engaging protrusion 25 is received in a residual hole 49C that is left after cutting and bending of a contact terminal 231C. A play 493C is provided within the residual hole 49c that acts as a driven-side engaging means, and the engaging protrusion 25 can move within a range of play 493C within the residual hole 49c. A base 234 of the contact terminal 231C vertically protrudes, and the engaging protrusion 25 engages the base 234 of the contact terminal 231C upon the rotation of the carrier 19 in the forward rotational direction R. The residual hole 49C is an arcuate hole extending along a circle whose center coincides with the rotational axis 161 of the carrier 19.

In the eleventh embodiment, advantages similar to those described in the above sections (1-9), (1-11) and (1-13)–(1-15) of the first embodiment and those of the ninth embodiment are achieved. In the follower 23F, a normal rotational direction of the carrier 19 can be used for either one of the forward rotational direction R and the backward rotation.

Twelfth Embodiment

Figure 16:
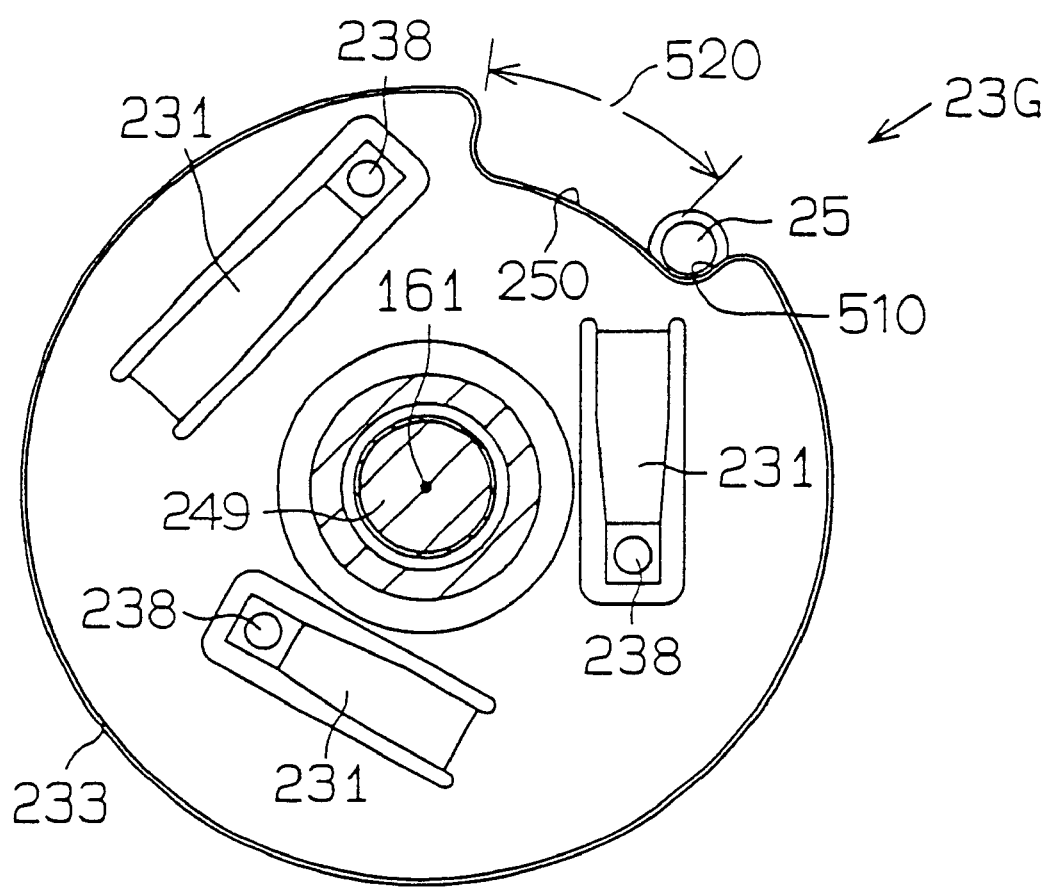
FIG. 16 is a partial cross-sectional plan view of a rotational-position sensing device according to a twelfth embodiment of the present invention.

A twelfth embodiment of the present invention will be described with reference to FIG. 16. The components similar to those of the first embodiment will be indicated by similar numerals in the following description.

A follower 23G of the present embodiment has an engaging recess 250 formed along a peripheral edge of the follower 23G. The engaging recess 250 extends along a circle whose center coincides with the rotational axis 161 of the output shaft 16. The engaging protrusion 25 is received within the engaging recess 250. When the carrier 19 rotates in the forward rotational direction R, the engaging protrusion 25 engages one end 510 of the engaging recess 250. A play 520 is provided in the engaging recess 250 that acts as a driven-side engaging means, and the engaging protrusion 25 can move within a range of play 520 within the engaging recess 250. The engaging recess 250 is integrally formed in the follower 23G by press work. A reinforcing wall 233 that engages the engaging protrusion 25 provides functions similar to those of the engaging walls 241 and 492 formed by burring in the first and ninth embodiments, respectively.

In the twelfth embodiment, advantages similar to those described in the above sections (1-9), (1-11), (1-14) and (1-15) of the first embodiment are achieved.

Thirteenth Embodiment

A thirteenth embodiment of the present invention will be described with reference to FIGS. 17A–17C. The components similar to those of the first embodiment will be indicated by similar numerals in the following description.

Figure 17A:
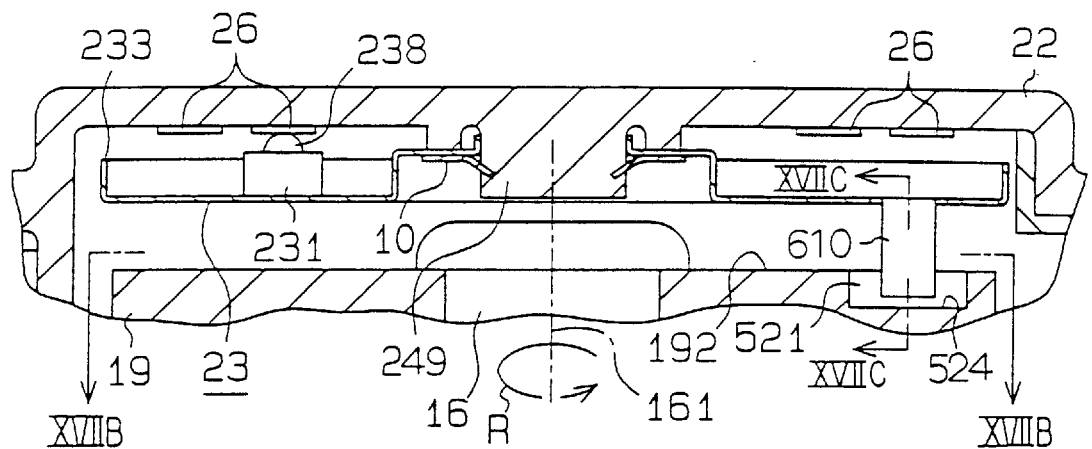
FIG. 17A is a partial longitudinal cross-sectional view of a rotational-position sensing device according to a thirteenth embodiment of the present invention.

With reference to FIG. 17A, an engaging protrusion 610 is integrally formed in the follower 23. The engaging protrusion 610 is formed by cutting a corresponding portion of the follower 23 and then bending it toward the carrier 19. An engaging recess 524 is formed in the opposing surface 192 of the carrier 19 that opposes the follower 23. A distal end of the engaging protrusion 610 is received within the engaging recess 524 that rotates integrally with the carrier 19.

Figure 17B:
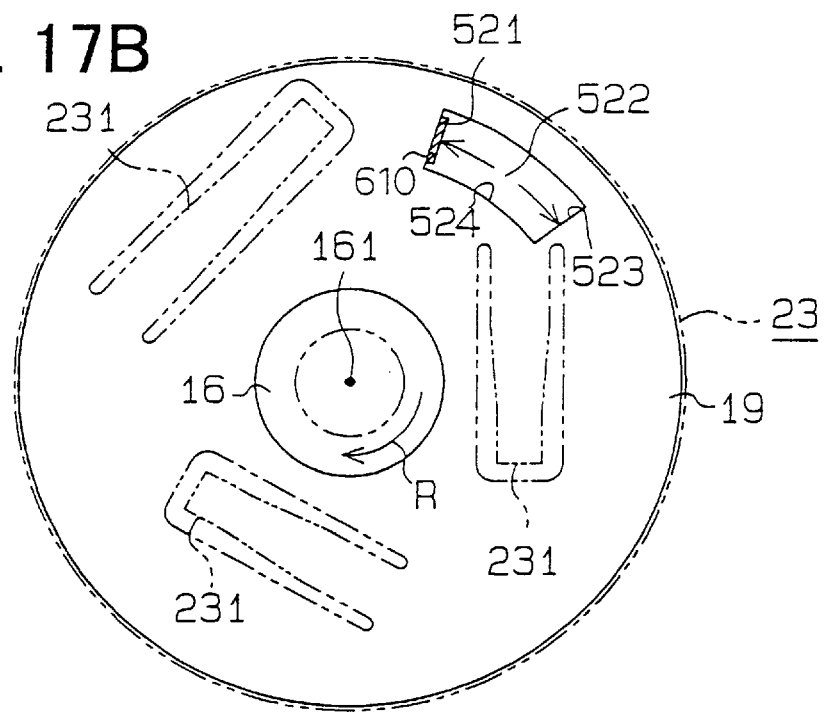
FIG. 17B is a cross-sectional view, on a reduced scale, taken along line XVIIB—XVIIB in FIG. 17A.

With reference to FIG. 17B, the engaging recess 524 is an arcuate groove extending along a circle whose center coincides with the rotational axis 161 of the output shaft 16. When the carrier 19 rotates in the forward rotational direction R upon actuation of the wiper drive motor (not shown), the distal end of the engaging protrusion 610 engages one circumferential end 521 of the engaging recess 524 to provide surface engagement therebetween. The rotation of the carrier 19 is transmitted to the follower 23 through the surface engagement between the engaging protrusion 610 and the circumferential end 521, so that the follower 23 is dragged to rotate about the spindle 249 synchronously with the rotation of the carrier 19.

Figure 17C:
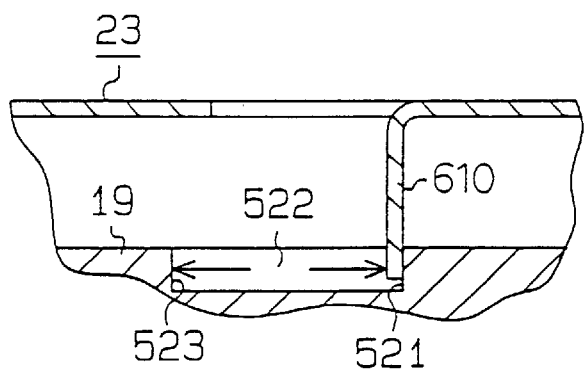
FIG. 17C is an enlarged cross-sectional view taken along line XVIIC—XVIIC in FIG. 17A.

With reference to FIG. 17C, a play 522 is provided in the engaging recess 524, and the engaging protrusion 610 can relatively move within a range of play 522 within the engaging recess 524. By way of example, it will be assumed that the engaging protrusion 610 is engaged with the circumferential end 521 of the engaging recess 524, i.e., the follower 23 can be immediately rotated upon rotation of the carrier 19 in the forward rotational direction R without a pause. In this state, if the wiper drive motor is forced to rotate backward, the engaging protrusion 610 is relatively moved from the one circumferential end 521 toward the other circumferential end 523 within the engaging recess 524. Thus, when the wiper drive motor is forced to rotate backward, the follower 23 will not be rotated backward by the backward rotation of the carrier 19 or of the wiper drive motor unless the engaging protrusion 610 moves all the way through the range of play 522 within the engaging recess 524.

The engaging protrusion 610 that acts as the driven-side engaging means can be easily manufactured through the cutting and bending work. Furthermore, the engaging recess 524 that acts as the driving-side engaging means can be relatively easily manufactured. The high manufacturability of the engaging protrusion 610 and the engaging recess 524 contributes to the high manufacturability of the rotational-position sensing device. The use of the engaging protrusion 610 that is formed by cutting and bending the metal follower 23 allows a reduction in the number of components of the rotational-position sensing device in comparison to the one in which the engaging protrusion is provided as a separate member.

Fourteenth Embodiment

A fourteenth embodiment of the present invention will be described with reference to FIGS. 18A–18C. The components similar to those of the first embodiment will be indicated by similar numerals in the following description.

Figure 18A:
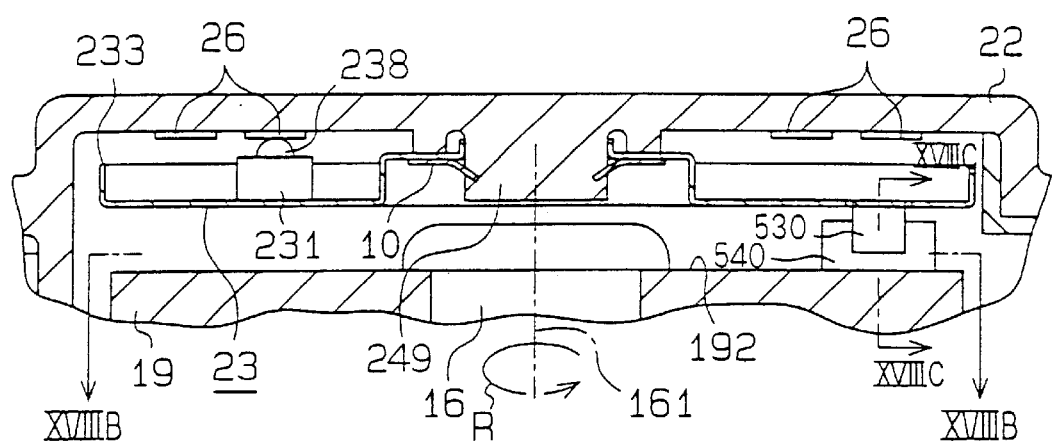
FIG. 18A is a partial longitudinal cross-sectional view of a rotational-position sensing device according to a fourteenth embodiment of the present invention.
Figure 18B:
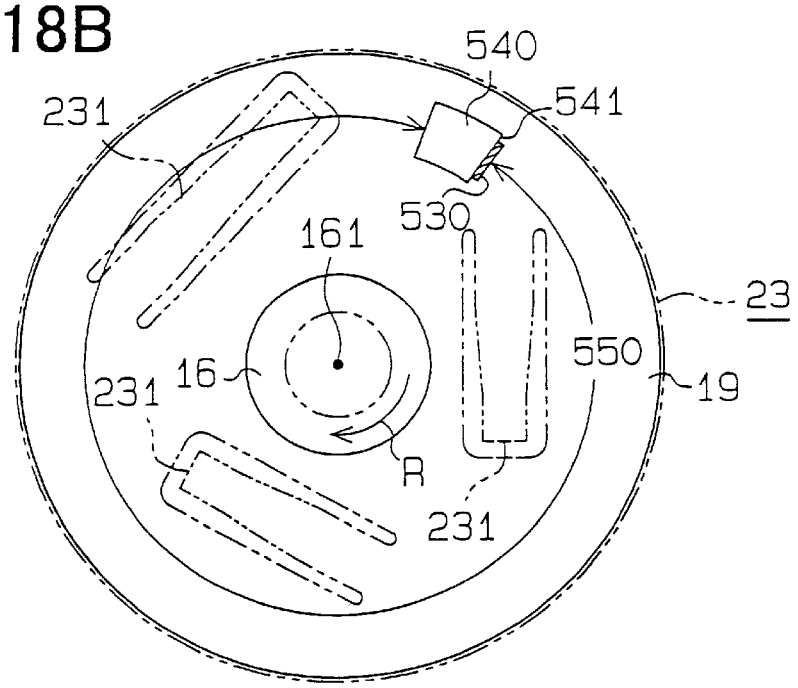
FIG. 18B is a cross-sectional view, on a reduced scale, taken along line XVIIIB—XVIIIB in FIG. 18A.
Figure 18C:
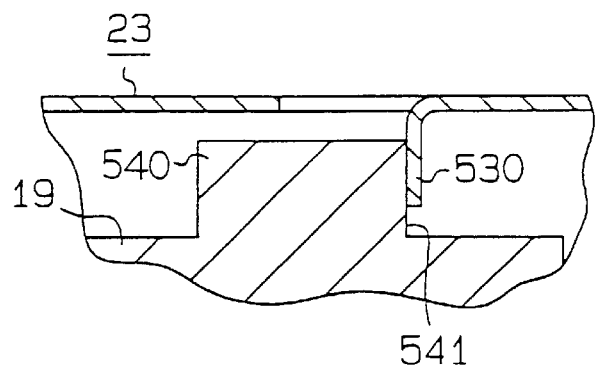
FIG. 18C is an enlarged cross-sectional view taken along line XVIIIC—XVIIIC in FIG. 18A.

With reference to FIGS. 18A and 18C, an engaging protrusion 530 is integrally formed in the follower 23. The engaging protrusion 530 is formed by cutting a corresponding portion of the follower 23 and then bending it toward the carrier 19. An engaging protrusion 540 is integrally formed in the opposing surface 192 of the carrier 19 that opposes the follower 23.

With reference to FIG. 18B, when the carrier 19 rotates in the forward rotational direction R upon actuation of the wiper drive motor (not shown), one circumferential end 541 of the engaging protrusion 540 engages one circumferential end of the engaging protrusion 530 to provide surface engagement therebetween (this position is referred to as a first position). The rotation of the carrier 19 is transmitted to the follower 23 through the surface engagement between the engaging protrusion 530 and the engaging protrusion 540, so that the follower 23 is dragged to rotate about the spindle 249 synchronously with the rotation of the carrier 19. The engaging protrusion 540 can move relative to the engaging protrusion 530 within a range of play 550. By way of example, it will be assumed that the engaging protrusion 530 is engaged with the one circumferential end 541 of the engaging protrusion 540, i.e., the follower 23 can be immediately rotated upon rotation of the carrier 19 in the forward rotational direction R without a pause. In this state, if the wiper drive motor is forced to rotate backward, the engaging protrusion 530 is spaced away from the engaging protrusion 540. Thus, when the wiper drive motor is forced to rotate backward, the follower 23 will not be rotated backward by the backward rotation of the carrier 19 or of the wiper drive motor unless the engaging protrusion 540 moves all the way through the range of play 550 relative to the engaging protrusion 530 and engages the other circumferential end surface of the engaging protrusion 530 (this position is referred to as a second position).

The engaging protrusion 530 that acts as the driven-side engaging means can be easily manufactured through the cutting and bending work, and the engaging protrusion 540 that acts as the driving-side engaging means can be relatively easily manufactured integrally with or separately from the carrier 19. The high manufacturability of the engaging protrusions 530 and 540 contributes to the high manufacturability of the rotational-position sensing device. The use of the engaging protrusion 530 that is formed by cutting and bending the metal follower 23 allows a reduction in the number of components of the rotational-position sensing device in comparison to the one in which the engaging protrusion is provided as a separate member. In the fourteenth embodiment, a sufficient amount of play 550 is provided, so that the arrangement of the fourteenth embodiment can be effectively used in a situation where the large backward rotation of the wiper drive motor is expected.

Fifteenth Embodiment

Figure 19A:
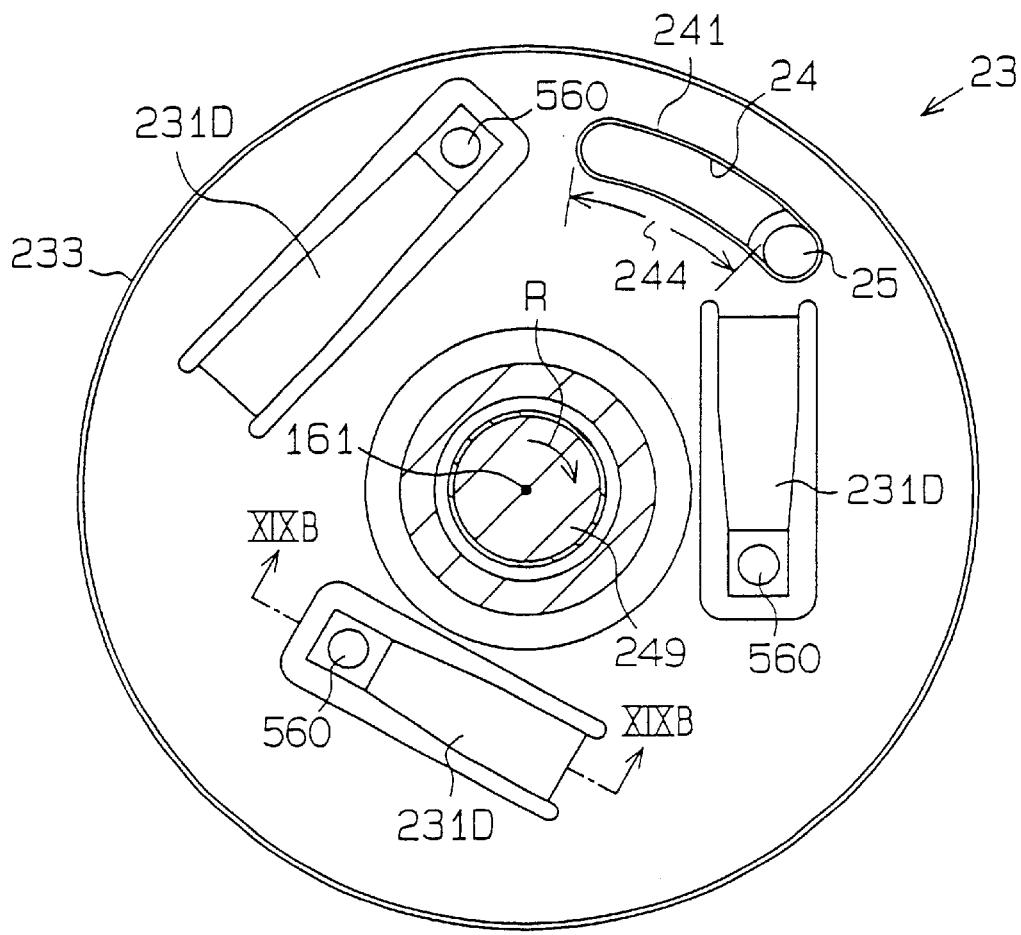
FIG. 19A is a partial cross-sectional plan view of a rotational-position sensing device according to a fifteenth embodiment of the present invention.
Figure 19B:
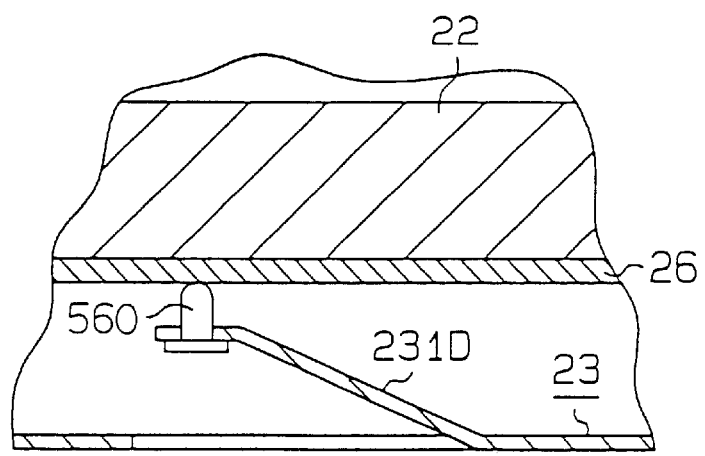
FIG. 19B is an enlarged cross-sectional view taken along line XIXB—XIXB in FIG. 19A.

A fifteenth embodiment of the present invention will be described with reference to FIGS. 19A and 19B. The components similar to those of the first embodiment will be indicated by similar numerals in the following description.

A rivet shaped contact member 560 penetrates through and is secured to a distal end of a contact terminal 231D that is integrally formed in the follower 23 by cutting a corresponding portion of the follower 23 and then bending it. The contact member 560 is made of an electrically conductive material separately from the contact terminal 231D. The contact member 560 engages and disengages with the switching pattern 26. By increasing a protruding length of the contact member 560 that protrudes from the contact terminal 231D toward the cover 22, an allowed abrasive amount of the contact member 560 can be increased. If the allowed abrasive amount of the contact member 560 is increased, a life period of the contact member 560 is accordingly increased.

Sixteenth Embodiment

Figure 20A:
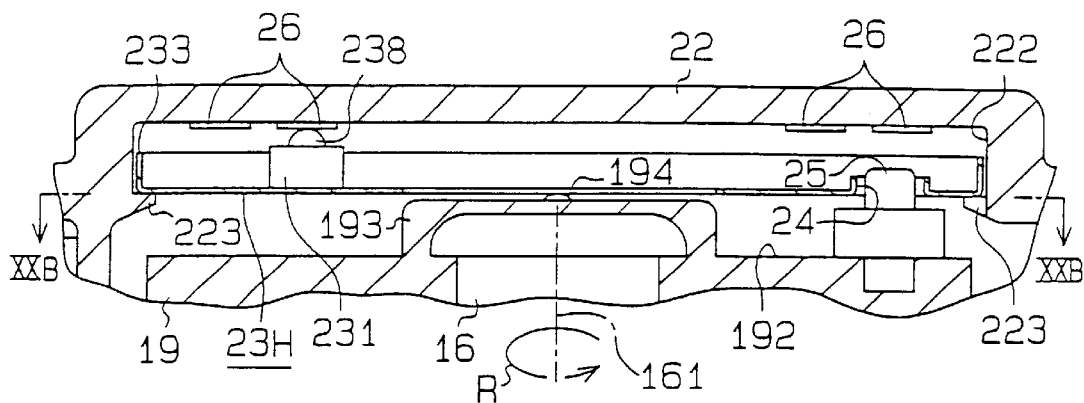
FIG. 20A is a partial longitudinal cross-sectional view of a rotational-position sensing device according to a sixteenth embodiment of the present invention.
Figure 20B:
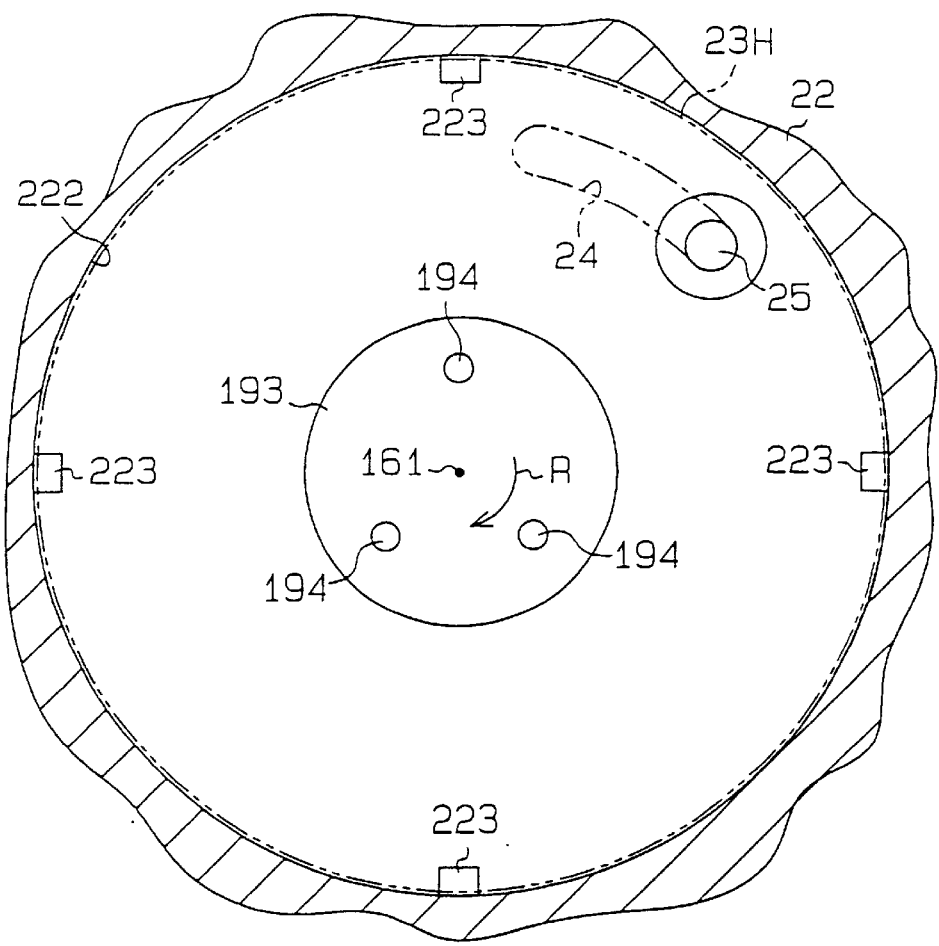
FIG. 20B is a cross-sectional view taken along line XXB—XXB in FIG. 20A.

A sixteenth embodiment of the present invention will be described with reference to FIGS. 20A and 20B. The components similar to those of the first embodiment will be indicated by similar numerals in the following description.

The cover 22 is made of a synthetic resin material, and a circumferential wall surface 222 is formed in the inner surface of the cover 22. A central axis of the circumferential wall surface 222 coincides with the rotational axis 161 of the carrier 19. A plurality (three in this embodiment) of support projections 223 are formed integrally with the circumferential wall surface 222 to project toward the rotational axis 161. A distal end of the output shaft 16 that opposes the cover 22 is covered with a bump 193 that constitutes a part of the carrier 19. A plurality (four in this embodiment) of semi-spherical support bulges 194 are integrally formed in a protruding end surface of the bump 193.

An outer peripheral surface of the reinforcing wall 233 of the follower 23H slidably engages the circumferential wall surface 222. The circumferential wall surface 222 that slidably engages the reinforcing wall 233 of the follower 23H keeps the rotational axis of the follower 23H to substantially coincide with the rotational axis 161 of the carrier 19. Each support projection 223 possesses resiliency and resiliently engages the peripheral edge of the follower 23H to rotatably support the follower 23H while preventing the follower 23H from falling out of the cover 22. The circumferential wall surface 222 provides radial support for the follower 23H. The support projections 223 provide axial support for the follower 23H in the axial direction of the rotational axis 161. Each support bulge 194 makes a point contact with a central portion of the follower 23H to support a reaction force exerted from the contact terminals 231 that are urged against the cover 22. Each support bulge 194 also minimizes frictional abrasion between the bump 193 and the follower 23H.

Seventeenth Embodiment

Figure 21:
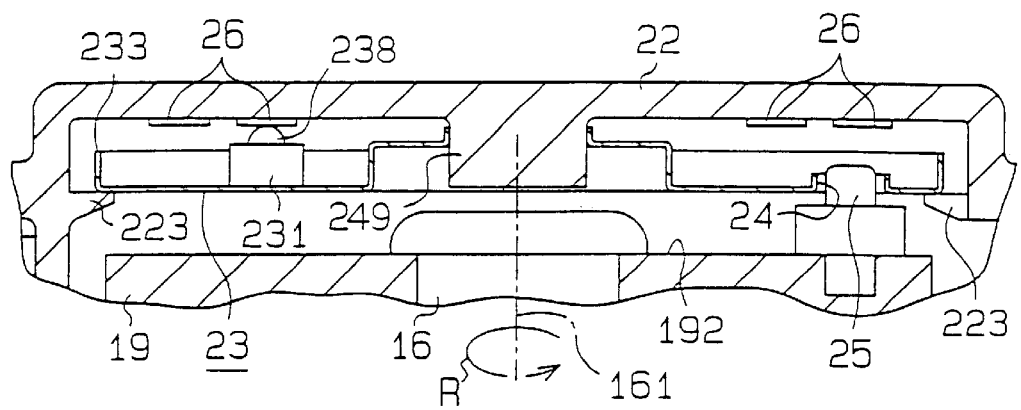
FIG. 21 is a partial longitudinal cross-sectional view of a rotational-position sensing device according to a seventeenth embodiment of the present invention.

A seventeenth embodiment of the present invention will be described with reference to FIG. 21. The components similar to those of the first and sixteenth embodiments will be indicated by similar numerals in the following description.

The follower 23 is rotatably fitted around the cylindrical spindle 249. The follower 23 is supported by the spindle 249 in such a manner that the rotational axis of the follower 23 coincides with the rotational axis 161 of the carrier 19. Similar to the first embodiment, the spindle 249 provides radial support for the follower 23, and the support projections 223 provide functions similar to those of the support projections 223 of the sixteenth embodiment.

Eighteenth Embodiment

Figure 22A:
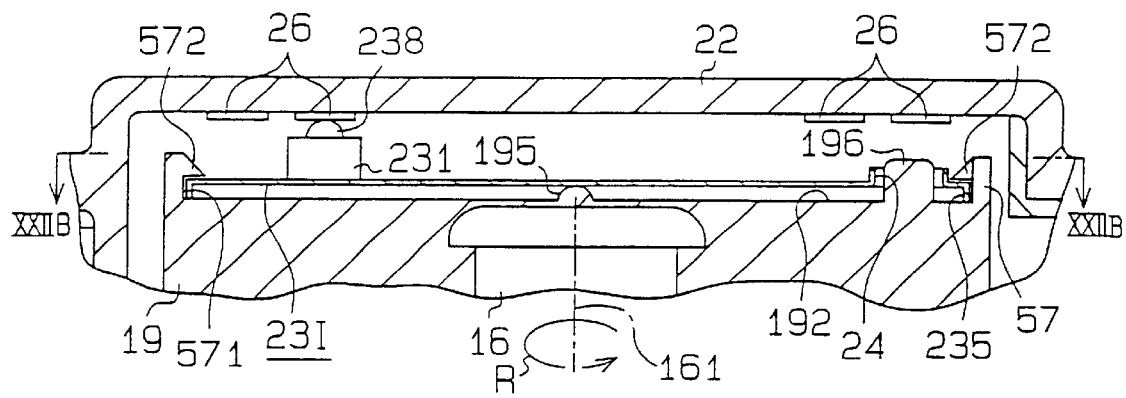
FIG. 22A is a partial longitudinal cross-sectional view of a rotational-position sensing device according to an eighteenth embodiment of the present invention.
Figure 22B:
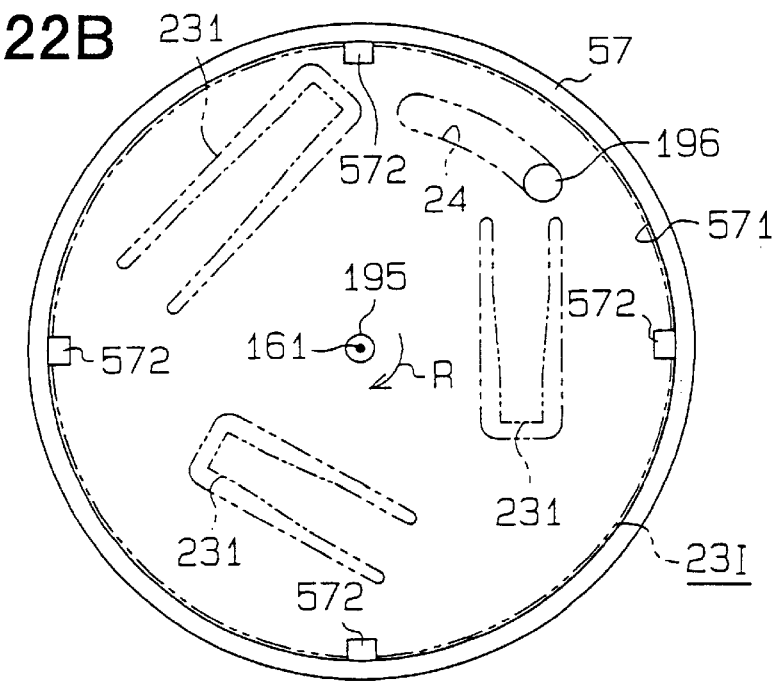
FIG. 22B is a cross-sectional view, on a reduced scale, taken along line XXIIB—XXIIB in FIG. 22A.

An eighteenth embodiment of the present invention will be described with reference to FIGS. 22A and 22B. The components similar to those of the sixteenth embodiment will be indicated by similar numerals in the following description.

The carrier 19 is made of a synthetic resin material, and an annular ridge 57 is integrally formed with the carrier 19 to protrude from a peripheral edge of the opposing surface of the carrier 19 toward the cover 22. A circumferential wall surface 571 is formed in an inner peripheral surface of the annular ridge 57. A central axis of the circumferential wall surface 571 coincides with the rotational axis 161 of the carrier 19. A plurality (four in this embodiment) of support projections 572 are formed integrally with the circumferential wall surface 571 to project toward the rotational axis 161. One end of the output shaft 16 that opposes the cover 22 is buried within the carrier 19. At a center of the opposing surface 192 of the carrier 19 that opposes the cover 22, a semi-spherical support bulge 195 is integrally formed in the carrier 19 to protrude therefrom. An engaging protrusion 196 that engages the engaging hole 24 is integrally formed in the carrier 19.

An annular reinforcing wall 235 is formed along a peripheral edge of a follower 23I by bending a corresponding portion of the follower 23I toward the carrier 19. An outer peripheral surface of the reinforcing wall 235 of the follower 23I engages the circumferential wall surface 571. The circumferential wall surface 571 that engages the reinforcing wall 235 of the follower 23I keeps the rotational axis of the follower 23I to substantially coincide with the rotational axis 161 of the carrier 19. Each support projection 572 possesses resiliency and resiliently engages the peripheral edge of the follower 23I to support the follower 23I while preventing the follower 23I from moving out of the carrier 19. The circumferential wall surface 571 provides radial support for the follower 23I. The support projections 572 provide axial support for the follower 23I in the axial direction of the rotational axis 161. The support bulge 195 supports a reaction force exerted from the contact terminals 231 that are urged against the cover 22. Frictional force is generated between the contact terminals 231 and the cover 22 by urging the contact terminals 231 against the cover 22. Thus, even if the carrier 19 is rotated backward, the follower 23I is held by the frictional force and does not rotate integrally with the carrier 19.

Nineteenth Embodiment

A nineteenth embodiment of the present invention will be described with reference to FIGS. 23A–23C. The components similar to those of the first embodiment will be indicated by similar numerals in the following description.

Figure 23A:
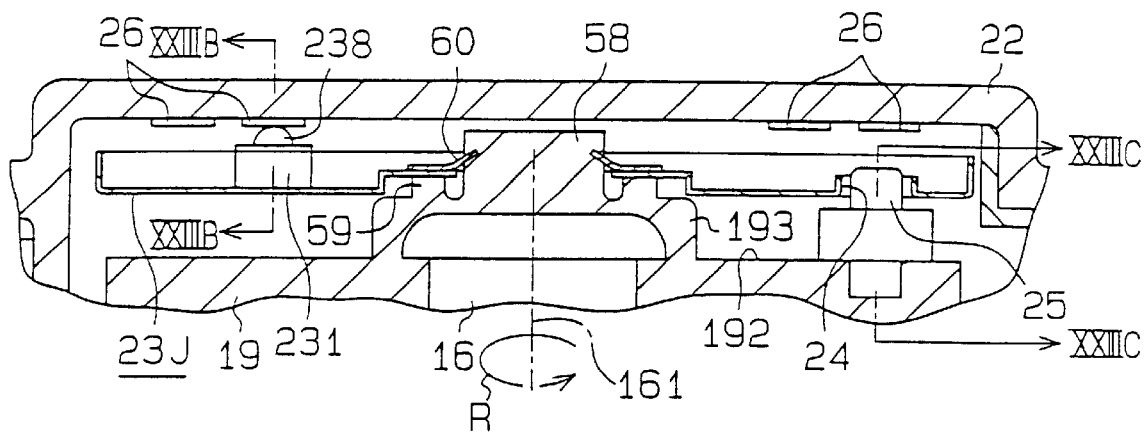
FIG. 23A is a partial longitudinal cross-sectional view of a rotational-position sensing device according to a nineteenth embodiment of the present invention.

With reference to FIG. 23A, one end of the output shaft 16 that opposes the cover 22 is covered with a bump 193 that constitutes a part of the carrier 19. A spindle 58 and an annular position-limiting ridge 59 are integrally formed in a protruding end surface of the bump 193 to protrude toward the cover 22. The annular position-limiting ridge 59 is formed to coaxially surround the spindle 58. A central axis of the spindle 58 coincides with the rotational axis 161 of the carrier 19. A follower 23J is rotatably fitted around the spindle 58. The follower 23J is supported by the spindle 58 in such a manner that the rotational axis of the follower 23J coincides with the rotational axis 161 of the carrier 19. The follower 23J is prevented from moving out of the spindle 58 by a detachment preventing ring 60. The follower 23J is clamped between the position-limiting ridge 59 and the detachment preventing ring 60.

The detachment preventing ring 60 limits movement of the follower 23J toward the cover 22 around the spindle 58. The position-limiting ridge 59 limits movement of the follower 23J toward the carrier 19 around the spindle 58. The position-limiting ridge 59 and the detachment preventing ring 60 maintain a predetermined space between the follower 23J and the switching pattern 26 while supporting the follower 23J in a rotatable manner around the spindle 58.

Figure 23B:
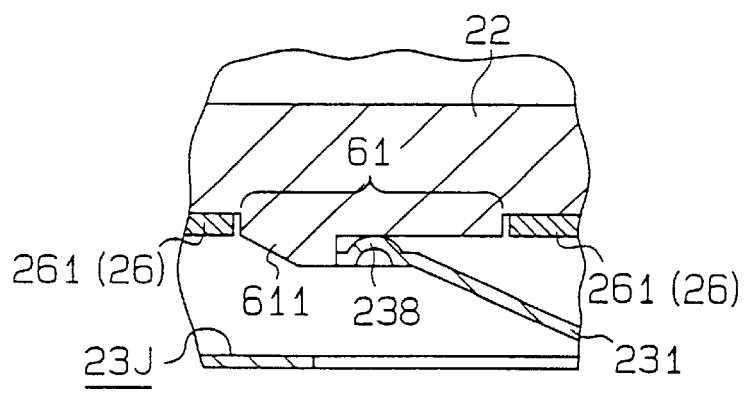
FIG. 23B is an enlarged cross-sectional view taken along line XXIIIB—XXIIIB in FIG. 23A.
Figure 23C:
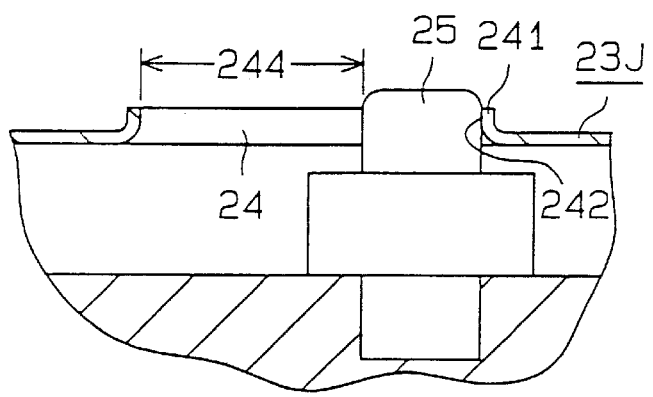
FIG. 23C is an enlarged cross-sectional view taken along line XXIIIC—XXIIIC in FIG. 23A.

FIG. 23B shows a first rotational position 61 in the switching pattern 26 that is provided for sensing a rotational position of the carrier 19 corresponding to a position of the wiper blades. The first rotational position 61 is provided for indicating the rotational position of the carrier 19 that corresponds to the predetermined stop position of the wiper blades. The first rotational position 61 that is a part of the inner surface of the cover 22 has a stop projection 611. The stop projection 611 axially protrudes beyond an electrical wiring portion 261 of the switching pattern 26 that is electrically connected to the contact 238 of the contact terminal 231 upon contacting the contact 238 of the contact terminal 231. The stop projection 611 allows the contact 238 of the contact terminal 231 to pass over the stop projection 611 when the carrier 19 is rotated in the forward rotational direction, and the stop projection 611 restrains the contact 238 of the contact terminal 231 from passing over the stop projection 611 when the carrier 19 is rotated in the backward rotational direction (i.e., the contact terminal 231 shown in FIG. 23B can move continuously beyond the stop projection 611 in a right direction in FIG. 23B but is restrained from moving over the stop projection 611 in a left direction in FIG. 23B).

When a relatively large amount of snow is present on the windshield near the stop position of the wiper blades, the carrier 19 could be forced to rotate backward right after the contact 238 of the contact terminal 231 passes over the stop projection 611. The play 244 within the engaging hole 24 shown in FIG. 23C allows relative movement of the engaging protrusion 25 within the engaging hole 24 when the carrier 19 rotates backward. Since the follower 23J is clamped between the position-limiting ridge 59 and the detachment preventing ring 60, the follower 23J can be dragged to follow the backward rotation of the carrier 19. However, the stop projection 611 restrains the contact 238 of the contact terminal 231 from passing over the stop projection 611 when the carrier 19 rotates backward. When the carrier 19 rotates backward, the stop projection 611 reliably prevents the follower 23J to follow the backward rotation of the carrier 19 at the first rotational position (the predetermined stop position of the wiper blades).

In the present invention, the following modifications of the above-described embodiments are also possible.

(1) In the first embodiment, a flat ring can be placed between the position-limiting ridge 50 of the cover 22 and the contact portion 236 of the follower 23.

(2) In the fifth embodiment, a flat ring can be placed between the opposing surface 221 of the cover 22 and the contact portion 236B of the follower 23B.

Figure 24:
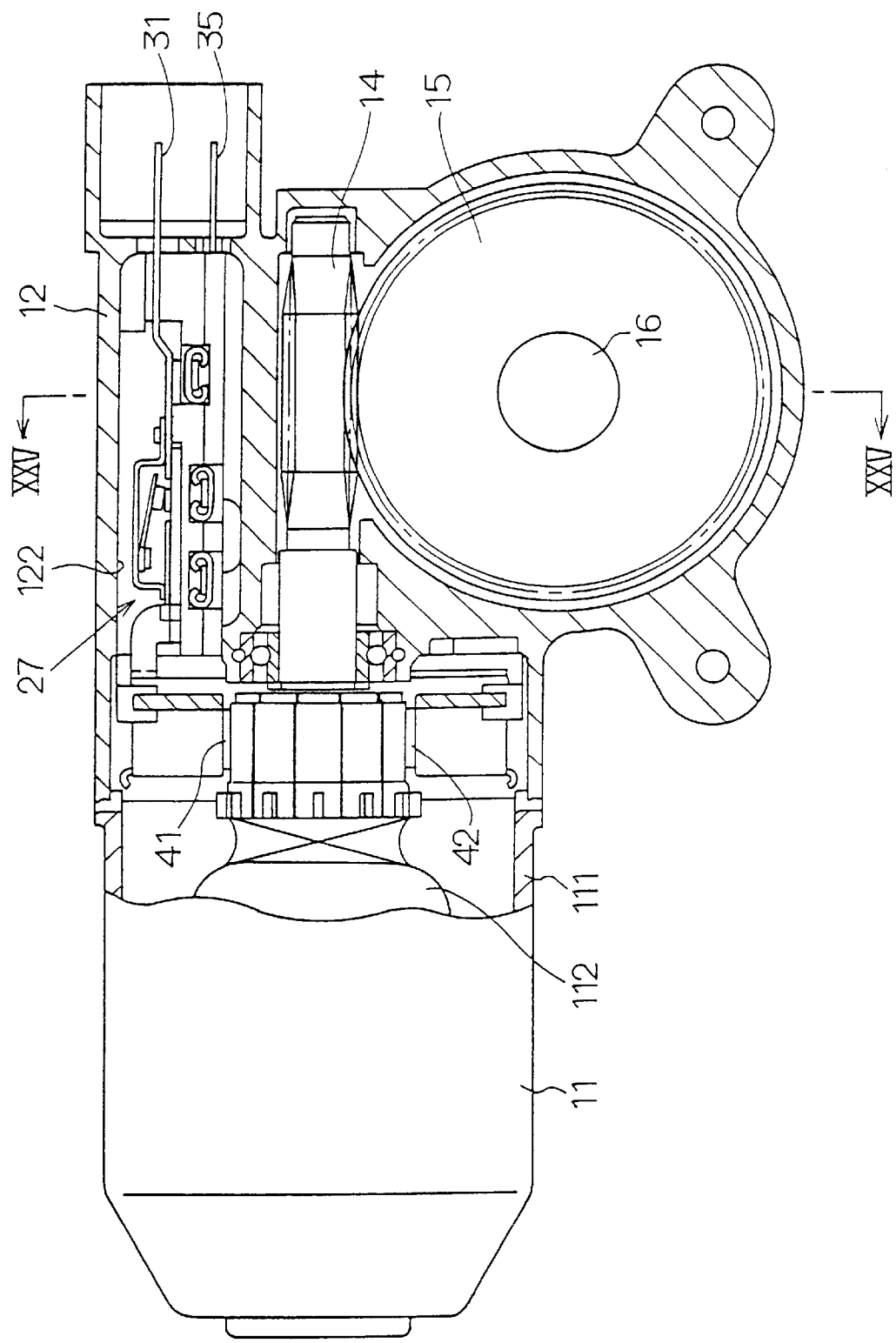
FIG. 24 is a cross-sectional plan view showing a modification of the first embodiment.
Figure 25:
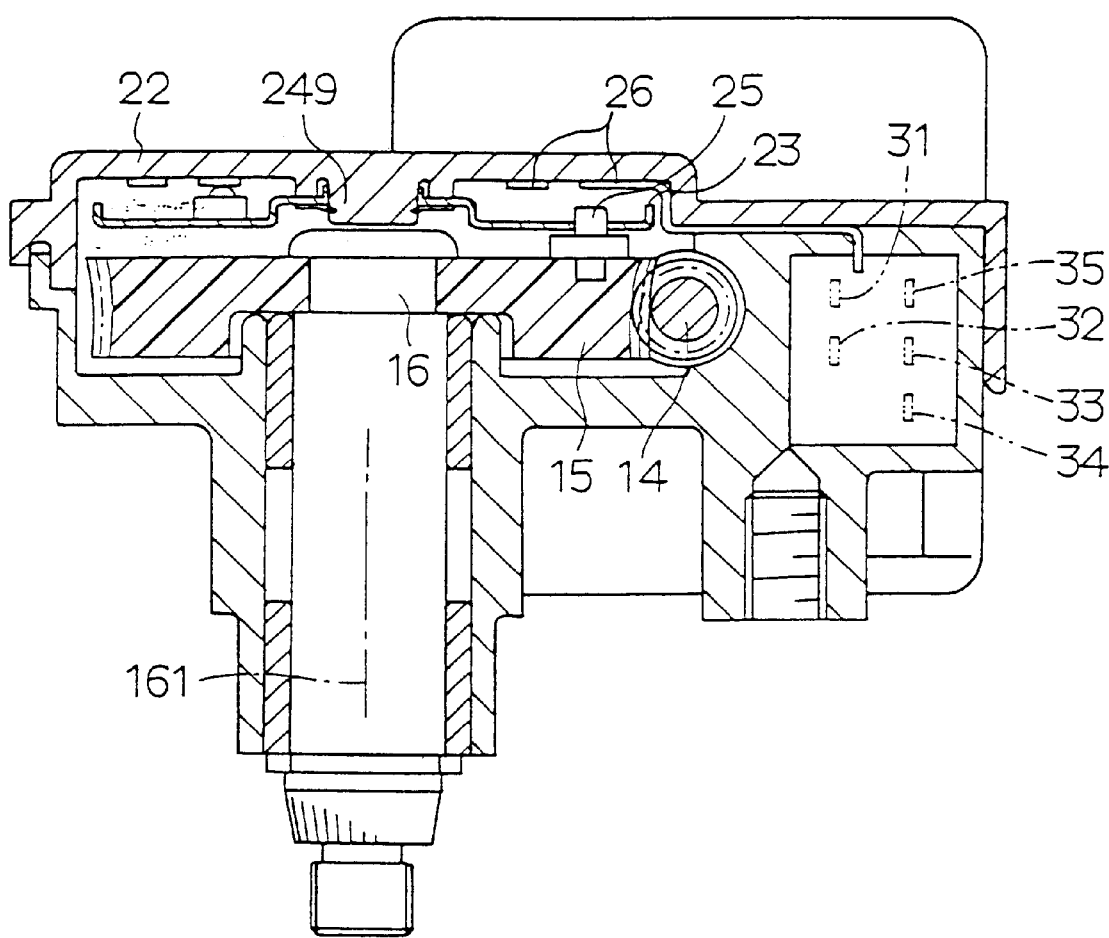
FIG. 25 is a cross-sectional view taken along line XXV—XXV in FIG. 24.
Figure 26:
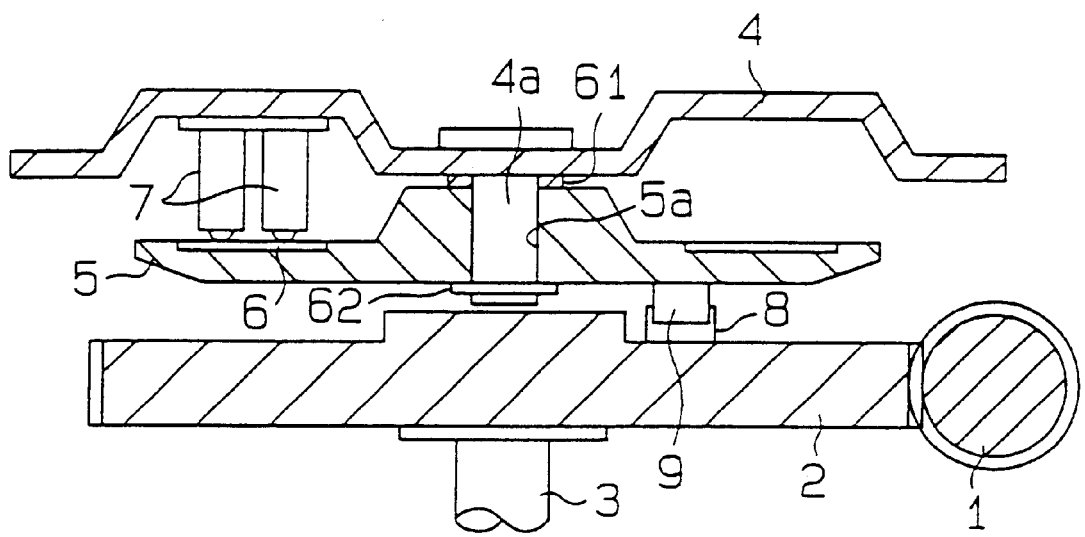
FIG. 26 is a partial longitudinal cross-sectional view of a previously proposed rotational-position sensing device for a windshield wiper system.

(3) The present invention can be applied to a windshield wiper system that includes only the first speed reducing gear mechanism 13 having the worm 14 and the worm wheel 15. One instance is shown in FIGS. 24 and 25. An arrangement is similar to that of the first embodiment shown in FIGS. 1 and 2 except that the second speed reducing gear mechanism 17 is eliminated. In this instance, the worm wheel 15 acts as the rotator, and the engaging protrusion 25 is securely connected to the worm wheel 15. The operation of this instance is similar to that of the first embodiment.

(4) The engaging protrusion 25 can be made of a metal material. In such a case, the formation of the engaging wall by burring in each one of the above described embodiments can be eliminated.

(5) The engaging protrusion 25 can be integrally formed with the carrier 19 if appropriate.

Additional advantages and modifications will readily occur to those skilled in the art. The invention in its broader terms is therefore, not limited to the specific details, representative apparatus, and illustrative examples shown and described.

What is claimed is:
1. A rotational-position sensing device comprising:
a stationary body including a switching pattern;

a rotator rotatably supported by said stationary body, said rotator having a driving-side engaging means, said switching pattern being provided around a rotational axis of said rotator; and a follower receiving a rotational force to rotate about said rotational axis from said rotator through said driving-side engaging means, said follower being made of an electrically conductive metal plate, said follower having a plurality of contact terminals integrally formed in said electrically conductive metal plate, said follower further including a driven-side engaging means that receives said rotational force from said rotator during rotation of said rotator in a forward rotational direction upon engagement with said driving-side engaging means in a forward rotational engaged position, wherein:

said rotational-position sensing device senses a rotational position of said rotator through engagement and disengagement of said contact terminals with said switching pattern based on rotation of said follower; and said driven-side engaging means has a play, said play allowing said driving-side engaging means to move away from said forward rotational engaged position without transmitting said rotational force to said follower when said rotator rotates in a backward rotational direction.

2. A rotational-position sensing device according to claim 1, wherein:

one of said driving-side engaging means and said driven-side engaging means is an engaging protrusion; and the other of said driving-side engaging means and said driven-side engaging means is an engaging recess to which said engaging protrusion is engaged.

3. A rotational-position sensing device according to claim 1, wherein both said driving-side engaging means and said driven-side engaging means are engaging protrusions.

4. A rotational-position sensing device according to claim 1, wherein:

said driven-side engaging means is an engaging hole penetrating through said follower; and said follower has an engaging wall along a peripheral edge of said engaging hole, said engaging wall being produced by burring said electrically conductive metal plate in such a manner that said engaging wall protrudes from said peripheral edge of said engaging hole.

5. A rotational-position sensing device according to claim 1, wherein:

said electrically conductive metal plate has resiliency;

said contact terminals are manufactured by cutting and bending said electrically conductive metal plate; and said driven-side engaging means is a residual hole that is left in said electrically conductive metal plate after one of said contact terminals is manufactured by cutting and bending said electrically conductive metal plate.

6. A rotational-position sensing device according to claim 1, wherein said driven-side engaging means is an arcuate hole extending along a circle whose center coincides with said rotational axis of said rotator.

7. A rotational-position sensing device according to claim 1, wherein:

said driven-side engaging means is an elongated hole having a space that allows movement of said driving-side engaging means away from said forward rotational engaged position through said space when said rotator rotates in said backward rotational direction; and an amount of said play corresponds to a size of said space of said elongated hole.

8. A rotational-position sensing device according to claim 3, wherein an amount of said play corresponds to a size of a rotational angular space between a first position of said engaging protrusion of said rotator where said engaging protrusion of said rotator engages one circumferential end of said engaging protrusion of said follower to a second position of said engaging protrusion of said rotator where said engaging protrusion of said rotator engages the other circumferential end of said engaging protrusion of said follower.

9. A windshield wiper system comprising a wiper arm with a wiper blade connected thereto, a motor and a control device, said motor having a rotational-position sensing device for sensing a rotational position of said wiper blade, a gear housing and a speed reducing mechanism, said gear housing including a receiving recess and a cover for covering said receiving recess, said speed reducing mechanism being received within said receiving recess, said speed reducing mechanism being connected to an output shaft for outputting a rotational force of said speed reducing mechanism, said control device including a wiper switch and controlling said motor based on an operation mode selected through said wiper switch, said wiper arm and said wiper blade being reciprocally swung by a rotational driving force of said motor, wherein said rotational-position sensing device includes:

a rotator rotatably supported by said gear housing, said rotator having a driving-side engaging means and rotating integrally with said output shaft;

a switching pattern formed in said cover around a rotational axis of said rotator, said switching pattern including a first rotational position and a second rotational position, said first rotational position corresponding to a predetermined stop position of said wiper blade, said second rotational position indicating a rotational position of said wiper blade other than said first rotational position of said wiper blade; and a follower made of an electrically conductive metal plate, said follower including a plurality of contact terminals and a driven-side engaging means, said contact terminals being integrally formed in said electrically conductive metal plate, said contact terminals engaging and disengaging with said switching pattern, said driven-side engaging means receiving a rotational force to rotate about said rotational axis during rotation of said rotator in a forward rotational direction upon engagement with said driving-side engaging means in a forward rotational engaged position, said driven-side engaging means having a play, said play allowing said driving-side engaging means to move away from said forward rotational engaged position without transmitting said rotational force to said follower when said rotator rotates in a backward rotational direction.

10. A windshield wiper system according to claim 9, wherein:

said mode includes a stop mode for stopping said wiper blade at said predetermined stop position;

said control device rotates said motor to move said wiper blade to said predetermined stop position if said rotational-position sensing device senses said second rotational position when said stop mode is selected through said wiper switch; and said control device stops said motor if said rotational-position sensing device senses said first rotational position when said stop mode is selected through said wiper switch.

11. A windshield wiper system according to claim 9, wherein:
   said driven-side engaging means is an engaging hole penetrating through said follower; and
   said follower has an engaging wall along a peripheral edge of said engaging hole, said engaging wall being produced by burring said electrically conductive metal plate in such a manner that said engaging wall protrudes from said peripheral edge of said engaging hole.

12. A windshield wiper system according to claim 9, wherein:
   said electrically conductive metal plate has resiliency;
   said contact terminals are manufactured by cutting and bending said electrically conductive metal plate; and
   said driven-side engaging means is a residual hole that is left in said electrically conductive metal plate after one of said contact terminals is manufactured by cutting and bending said electrically conductive metal plate.

13. A windshield wiper system according to claim 9, wherein said driven-side engaging means is an arcuate hole extending along a circle whose center coincides with said rotational axis of said rotator.

14. A windshield wiper system according to claim 9, wherein:
   said driven-side engaging means is an elongated hole having a space that allows movement of said driving-side engaging means away from said forward rotational engaged position through said space when said rotator rotates in said backward rotational direction; and
   an amount of said play corresponds to a size of said space of said elongated hole.

15. A rotational-position sensing device comprising:
   a stationary body;
   a rotator rotatably supported by said stationary body;
   a follower rotatably supported by a support element provided on said stationary body, said support element being coaxial with said rotator, said follower being positioned between said stationary body and said rotator and receiving a rotational force from said rotator, said follower having a cylindrical engaging portion provided at a center of said follower, said cylindrical engaging portion having a peripheral surface that slidably engages a peripheral surface of said support element;
   a switching pattern formed in one of said stationary body and said follower;
   a plurality of contact terminals formed in the other of said stationary body and said follower, a rotational position of said rotator being sensed through engagement and disengagement of said contact terminals with said switching pattern based on rotation of said follower, a signal indicative of said rotational position of said rotator being outputted from said rotational-position sensing device; and
   a space maintaining means provided around said support element to maintain a predetermined space between said follower and an opposing surface of said stationary body that axially opposes said follower.

16. A rotational-position sensing device according to claim 15, wherein said space maintaining means is a position-limiting protrusion that protrudes around said support element from said opposing surface of said stationary body that opposes said follower, said position-limiting protrusion having a distal end surface that slidably engages said follower.

17. A rotational-position sensing device according to claim 16, wherein said position-limiting protrusion is annular, a peripheral surface of said position-limiting protrusion slidably engaging said peripheral surface of said cylindrical engaging portion of said follower, said position-limiting protrusion also acting as said support element for rotatably supporting said follower.

18. A rotational-position sensing device according to claim 16, wherein said position-limiting protrusion is an annular position-limiting ridge that surrounds said support element.

19. A rotational-position sensing device according to claim 16, wherein said space maintaining means further includes a toothed washer having a tooth portion and a flat portion, said tooth portion being engaged with said stationary body, said flat portion cooperating with said distal end surface of said position-limiting protrusion to clamp said follower in a rotatable manner between said flat portion and said distal end surface of said position-limiting protrusion.

20. A rotational-position sensing device according to claim 15, wherein said follower includes a contact portion, an outer cylindrical portion and an annular disk portion, said contact portion being bent to extend radially outwardly from said cylindrical engaging portion and being in surface contact with said stationary body, said outer cylindrical portion being bent to extend axially from said contact portion and being coaxial with said cylindrical engaging portion, said annular disk portion being bent to extend radially outwardly from said outer cylindrical portion, said annular disk portion having one of said contact terminals and said switching pattern, said space maintaining means further including said contact portion, said outer cylindrical portion and said annular disk portion of said follower.

21. A rotational-position sensing device according to claim 15, wherein:
   said follower is disk shaped and is made of an electrically conductive metal plate; and
   said follower has an annular reinforcing wall protruding from an outer peripheral edge of said follower.

22. A windshield wiper system comprising:
   a wiper;
   a reciprocating swing mechanism for reciprocally swinging said wiper;
   a motor having a gear housing;
   a speed reducing mechanism received in said gear housing to transmit rotation of said motor at a reduced speed, said rotation of said motor being transmitted to said wiper through said speed reducing mechanism and said reciprocating swing mechanism to reciprocally swing said wiper;
   a rotational-position sensing device including:
      a rotator rotatably supported by said gear housing, said rotator being integrally rotated with an output shaft that receives a rotational force from said speed reducing mechanism;
      a follower rotatably supported by a support element provided in said gear housing, said support element being coaxial with said rotator, said follower being positioned between said gear housing and said rotator and receiving a rotational force from said rotator, said follower having a cylindrical engaging portion provided at a center of said follower, said cylindrical engaging portion having a peripheral surface that slidably engages a peripheral surface of said support element;
      a switching pattern formed in one of said gear housing and said follower;

a plurality of contact terminals formed in the other of said gear housing and said follower; and a space maintaining means provided around said support element to maintain a predetermined space between said follower and an opposing surface of said gear housing that axially opposes said follower; and a control device including a wiper switch that is switched between a stop position and an actuation position, wherein:

a rotational position of said rotator being sensed through engagement and disengagement of said contact terminals with said switching pattern based on rotation of said follower, a signal indicative of said rotational position of said rotator being outputted from said rotational-position sensing device;

said control device rotates said motor until said rotational-position sensing device senses a rotational position of said rotator that corresponds to a predetermined stop position of said wiper after said wiper switch is switched to said stop position to stop said windshield wiper system; and said control device stops said motor when said rotational-position sensing, device senses said rotational position of said rotator that corresponds to said predetermined stop position of said wiper.

23. A windshield wiper system according to claim 22, wherein said space maintaining means is a position-limiting protrusion that protrudes around said support element from said opposing surface of said stationary body that opposes said follower, said position-limiting protrusion having a distal end surface that slidably engages said follower.

24. A windshield wiper system according to claim 23, wherein said position-limiting protrusion is annular, a peripheral surface of said position-limiting protrusion slidably engaging said peripheral surface of said cylindrical engaging portion of said follower, said position-limiting protrusion also acting as said support element for rotatably supporting said follower.

25. A windshield wiper system according to claim 23, wherein said position-limiting protrusion is an annular position-limiting ridge that surrounds said support element.

26. A windshield wiper system according to claim 22, wherein said follower further includes a contact portion, an outer cylindrical portion and an annular disk portion, said contact portion being bent to extend radially outwardly from said cylindrical engaging portion and being in surface contact with said stationary body, said outer cylindrical portion being bent to extend axially from said contact portion and being coaxial with said cylindrical engaging portion, said annular disk portion being bent to extend radially outwardly from said outer cylindrical portion, said annular disk portion having one of said contact terminals and said switching pattern, said space maintaining means further including said contact portion, said outer cylindrical portion and said annular disk portion of said follower.

27. A windshield wiper system according to claim 22, wherein:

said follower is disk shaped and is made of an electrically conductive metal plate; and said follower has an annular reinforcing wall protruding from an outer peripheral edge of said follower.

* * * * *